United States Patent [19]

Matzner et al.

[11] Patent Number: 5,084,530

[45] Date of Patent: * Jan. 28, 1992

[54] POLY(ARYL ETHER SULFONE)-POLY(ARYL ETHER KETONE) BLOCK COPOLYMERS

[75] Inventors: Markus Matzner, Edison; James H. Botkin, Highland Park; Paul A. Winslow, Millington, all of N.J.

[73] Assignee: Amoco Corporation, Chicago, Ill.

[*] Notice: The portion of the term of this patent subsequent to Nov. 6, 2007 has been disclaimed.

[21] Appl. No.: 562,640

[22] Filed: Aug. 3, 1990

Related U.S. Application Data

[62] Division of Ser. No. 734,760 Aug. 22, 1988, now U.S. Pat. No. 4,968,758.

[51] Int. Cl.$^5$ ............... C08L 61/02; C08L 81/06
[52] U.S. Cl. .................. 525/471; 525/905; 525/906
[58] Field of Search ............ 525/471, 905, 906

[56] References Cited

U.S. PATENT DOCUMENTS 4,056,511 11/1977 Staniland .................. 528/125

Primary Examiner—Paul R. Michl
Assistant Examiner—Yong S. Lee
Attorney, Agent, or Firm—Frederick S. Jerome; William H. Magidson; Ralph C. Medhurst

[57] ABSTRACT

Novel poly(aryl ether sulfone)-poly(aryl ether ketone) block copolymers are described. They are prepared by the nucleophilic polycondensation of a hydroxy- or halo-terminated poly(aryl ether ketone) oligomer with the poly(aryl ether sulfone) forming reagents; alternatively, a preformed poly(aryl ether sulfone) block may be used.

The novel copolymers are tough materials with excellent heat, solvent, and stress-crack resistance. They display high HDT's (heat distortion temperatures) and are useful in molding, extrusion and composites applications.

14 Claims, No Drawings

POLY(ARYL ETHER SULFONE)-POLY(ARYL ETHER KETONE) BLOCK COPOLYMERS

This is a division of application Ser. No. 234,760, filed Aug. 22, 1988, now U.S. Pat. No. 4,968,758.

FIELD OF THE INVENTION

This invention is directed to novel block copolymer compositions and to processes for the preparation thereof. The novel materials described herein are comprised of poly(aryl ether sulfone) blocks and of poly(aryl ether ketone) blocks. They are prepared by the condensation of an appropriately (i.e. hydroxyl or halo) terminated poly(aryl ether ketone) oligomer with the poly(aryl ether sulfone) forming monomers. Alternatively, the poly(aryl ether sulfone) block may be prepared in a separate step and then condensed with the poly(aryl ether ketone) segment. The condensations are performed in aprotic solvents, in the presence of a base. A variety of base systems may be used.

The novel block copolymers are tough materials with excellent high temperature properties. They display an outstanding chemical, solvent and stress-crack resistance. At low levels of the poly(aryl ether ketone) good transparency is observed. Thus, these "low aryl ether ketone content" resins are suitable for applications where a degree of transparency and chemical resistance are required. The degree of crystallinity increases with the weight percent of the aryl ether ketone blocks. At ether ketone levels above about 70 to 75 weight percent highly crystalline opaque resins, melting generally above 300° C. are obtained. Their most important advantage over the corresponding poly(aryl ether ketone) homopolymers resides in their higher heat distortion temperatures (HDT)($\geq 160°$ C.). This makes them particularly attractive in applications such as matrix resins for advanced composites, where both a high glass transition temperature (Tg) (=high HDT) and a high melting point (Tm) are desirable.

BACKGROUND OF THE INVENTION

Over the years, there has been developed a substantial body of patent and other literature directed to the formation and properties of poly(aryl ethers) (hereinafter called "PAE"). Some of the earliest work such as by Bonner, U.S. Pat. No. 3,065,205, involves the electrophilic aromatic substitution (e.g. Friedel-Crafts catalyzed) reaction of aromatic diacylhalides with unsubstituted aromatic compounds such as diphenyl ether. The evolution of this class to a much broader range of PAE's was achieved by Johnson et al., Journal of Polymer Science, A-1, Vol. 5, 1967, pp. 2415-2427, Johnson et al., U.S. Pat. Nos. 4,108,837 and 4,175,175. Johnson et al., show that a very broad range of PAE can be formed by the nucleophilic aromatic substitution (condensation) reaction of an activated aromatic dihalide and an aromatic diol. By this method, Johnson et al. created a host of new PAE's including a broad class of poly(aryl ether ketones), hereinafter called "PAEK's".

PAE's presenting the greatest practical interest are those that contain the sulfone group. Thus, poly(aryl ether sulfones) (1) and (2)

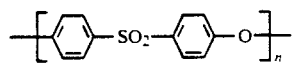
(1)

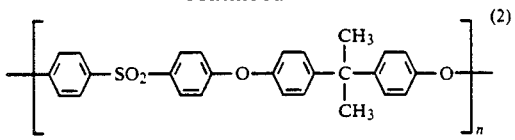

are commercially available tough thermoplastic materials. They possess a number of attractive features such as excellent high temperature resistance, good electrical properties, and very good hydrolytic stability. Polymer (1) is available from Imperial Chemical Industries, Ltd. under the trademark of Victrex Poly(ether sulfone). It is produced by the polycondensation of 4,4'-dihydroxydiphenyl sulfone with 4,4'-dichlorodiphenyl sulfone as described in, for example, Canadian Patent No. 847,963. The resin contains no aliphatic moeities and has a heat deflection temperature of approximately 210° C. Material (2) is available from Amoco Performance Products, Inc., under the trademark of UDEL ®. It has a heat deflection temperature of about 180° C., and is made via the nucleophilic polycondensation of bisphenol-A disodium salt with 4,4'-dichlorodiphenyl sulfone, as described in U.S. Pat. No. 4,108,837.

Poly(aryl ether sulfones) are generally amorphous transparent materials displaying high heat distortion temperatures (HDT's). Thus HDT's well above 200° C. have been observed for the polymers of formula (3) wherein Ar was (4), (5) or (6).

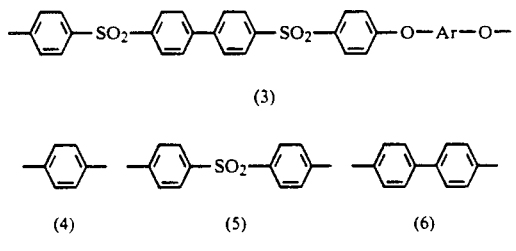
(3)

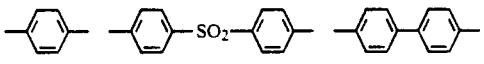
(4)

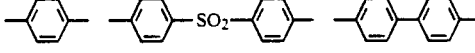
(5)

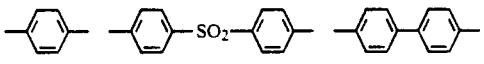
(6)

The most important drawback of poly(aryl ether sulfones) resides in their relatively low chemical, solvent and stress-crack resistance.

In recent years, there has developed a growing interest in poly(aryl ether ketones) (PAEK's) as evidenced by Dahl, U.S. Pat. No. 3,953,400; Dahl et al., U.S. Pat. No. 3,956,240; Dahl, U.S. Pat. No. 4,247,682; Rose et al, U.S. Pat. No. 4,320,224; Maresca, U.S. Pat. No. 4,339,568; Atwood et al., Polymer, 1981, Vol. 22, August, pp. 1096-1103; Blundell et al., Polymer, 1983, Vol. 24, August, pp. 953-958; Atwood et al., Polymer Preprints, 20, No. 1, April 1979, pp. 191-194; and Rueda et al., Polymer Communications, 1983, Vol. 24, September, pp. 258-260. In the early to mid-1970,s, Raychem Corporation commercially introduced a PAEK called STILAN ®, a polymer whose acronym is PEK, each ether and keto group being separated by 1,4-phenylene units. In 1978, Imperial Chemical Industries PLC (ICI) commercialized a PAEK under the trademark Victrex PEEK. As PAEK is the acronym of poly(aryl ether ketone), PEEK is the acronym of poly(ether ether ketone) in which the 1,4-phenylene units in the structure are assumed.

Thus, PAEKs are well known; they can be synthesized from a variety of starting materials; and they can be made with different melting temperatures and molecular weights. The PAEKs are crystalline, and as shown by the Dahl and Dahl et al. patents, supra, at sufficiently high molecular weights they can be tough, i.e., they exhibit high values (>50 ft-lb/in²) in the tensile impact test (ASTM D-1822). They have potential for a wide variety of uses, but because of the significant cost to manufacture them, they are expensive polymers. Their favorable properties class them in the upper bracket of engineering polymers.

PAEKs may be produced by the Friedel-Crafts catalyzed reaction of aromatic diacylhalides with unsubstituted aromatic compounds such as diphenyl ether as described in, for example, U.S. Pat. No. 3,065,205. These processes are generally inexpensive processes; however, the polymers produced by these processes have been stated by Dahl et al., supra, to be brittle and thermally unstable. The Dahl patents, supra, allegedly depict more expensive processes for making superior PAEKs by Friedel-Crafts catalysis. In contrast, PAEKs such as PEEK made by nucleophilic aromatic substitution reactions are produced from expensive starting fluoro monomers and thus would be classed as expensive polymers.

PAEK's generally display low HDT's. Victrex PEEK, for example, has an HDT of about 140°-160° C., depending on the degree of crystallinity. Thus, while the overall properties of poly(aryl ether ketones) are outstanding, their low HDT's exclude them from some very important applications.

PAEK block copolymers have been described in U.S. Pat. Nos. 4,052,365 and 4,268,635. U.S. Pat. No. 4,052,365 describes random or block copolymers having repeating units of the structure —Ar—O—Ar—CO— and —Ar—O—Ar—SO₂—. The patent states that these block copolymers are crystalline. U.S. Pat. No. 4,268,635 describes a process for preparing polymers containing —Ar—O—Ar—CO— and —Ar—O—Ar—SO₂— units which the patentee believes to contain block structures. The patent states that the polymers are crystalline and exhibit improved high temperature properties compared with totally random copolymers of similar composition.

U.S. Pat. No. 4,339,568 describes copolyethers based on hydroquinone, 4,4'-dichlorodiphenyl sulfone and 4,4'-difluorobenzophenone prepared by the nucleophilic route. While most of the copolymers considered in the subject patent are random, Example 6 describes a block copolymer containing 20 mole percent of sulfone groups and 80 mole percent of ketone groups.

German Patent Application DE 3,602,090 claims a process for the preparation of block copolymers containing sulfone and ketone groups. The process uses the nucleophilic polycondensation route, and consists in the sequential additions of the aryl ether sulfone reactants, followed by the aryl ether ketone reactants.

The instant invention is directed to novel block poly(aryl ether)-poly(aryl ether ketone) copolymers. The distinguishing feature of the materials herein described is that they are based on a group of unique poly(aryl ether ketone) oligomers, prepared via the electrophilic Friedel-Crafts route. The starting materials of this invention are made via a process which is different than the one used in U.S. Pat. No. 4,339,568 and in German Patent Application DE 3,602,090. In addition, their structure is not the same as that of the oligomers employed in the aforementioned references (vide infra). In the preferred variant of our copolymerization process, the block integrity is preserved to a much higher extent because both blocks are preformed prior to coupling.

THE INVENTION

The block copolymers of the present invention are of the formula $$\pm A-B \pm_m \qquad (7)$$

wherein A is a poly(aryl ether) block having no ketone linkages, preferably a poly(aryl ether sulfone) block; B is a poly(aryl ether ketone) block; and m is one or greater.

The molecular weight of the blocks A and/or B is at least 500, preferably at least 1,000, and most preferably at least 1,500. The weight ratio of the two blocks may vary within the range of 5:95 to 95:5, and is preferably 0:80 to 80:20.

The instant copolymers are tough materials with excellent high temperature properties. They possess several attractive features that were totally unexpected. Thus, at relatively low aryl ether ketone levels the materials have relatively good transparency; yet their chemical, solvent and stress-crack resistance are significantly improved in comparison with those of the corresponding poly(aryl ether) homopolymers. The resins are, therefore, particularly attractive in applications where both a degree of transparency and chemical, solvent and/or stress-crack resistance are required As the weight percentage of the aryl ether ketone blocks increases, the copolymers become opaque and highly crystalline. At aryl ether ketone contents above about 70 weight percent, and especially above about 75 weight percent, high melting points, generally above 300° C., are observed One of the most unusual and attractive features of these crystalline block copolymers is that they show quite often a one-phase morphology and display high (≧160° C.) HDT's. In some applications, such as in composites for example, a highly stable and tough matrix having a high heat distortion temperature is required This is due to the fact that polymers, even crystalline polymers, exhibit an excessive loss of modulus, strength and creep resistance above their HDT's. This loss in properties may not be acceptable in cases where the materials are to be used as thermoplastic matrix resins. Hence, a poly(aryl ether ketone) combining its generally excellent properties with a high heat distortion temperature is considered a truly remarkable product.

The aryl ether blocks of the instant invention are of the formula

—O—E—O—E'— wherein E is the residuum of a dihydric phenol, and E' is the residuum of a benzenoid compound having an inert electron withdrawing group in at least one of the positions ortho and para to the valence bonds; both of said residua are valently bonded to the ether oxygens through aromatic carbon atoms. Aromatic polyethers containing such units are described in, for example, U.S. Pat. Nos. 3,264,536 and 4,175,175. It is preferred that the dihydric phenol be a weakly acidic dinuclear phenol such as, for example, the dihydroxy diphenyl alkanes or the nuclear halogenated derivatives thereof, such as for example, the 2,2-bis(4-hydroxyphenyl)propane, 1,1-bis(4-hydroxyphenyl)2-phenyl ethane, bis(4-hydroxyphenyl)methane, or their chlorinated derivatives containing one or two chlorines on each aromatic ring. Other materials also termed appropriately bisphenols are also highly valuable and preferred. These materials are the bisphenols of a symmetrical or unsymmetrical joining group, as for example, ether oxygen (—O—), sulfone

or hydrocarbon residue in which the two phenolic nuclei are joined to the same or different carbon atoms of the residue.

Such dinuclear phenols can be characterized as having the structure:

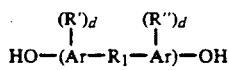

wherein Ar is an aromatic group and preferably is a phenylene group, R' and R" can be the same or different inert substituent groups such as alkyl groups having from 1 to 4 carbon atoms, aryl, halogen atoms, i.e., fluorine, chlorine, bromine or iodine, or akoxyl radicals having from 1 to 4 carbon atoms, the d's are independently integers having a value of from 0 to 4, inclusive, and $R_1$ is representative of a bond between aromatic carbon atoms as in dihydroxyl-diphenyl, or is a divalent radical, including for example, radicals such as —O—, —S—, —S—S— —SO—, —SO$_2$, and divalent hydrocarbon radicals such as alkylene, alkylidene, cycloalkylene, cycloalkylidene, or the halogen, alkyl, aryl, or like substituted alkylene, alkylidene or cycloaliphatic radicals as well as aromatic radicals and radicals fused to both Ar groups.

Examples of specific dihydric polynuclear phenols include among others:
the bis-(hydroxyaryl) alkanes such as
2,2-bis-(4-hydroxyphenyl)propane,
2,4'-dihydroxydiphenylmethane,
bis-(2-hydroxyphenyl)methane,
bis-(4-hydroxyphenyl)methane,
bis(4-hydroxy-2,6-dimethyl-3-methoxyphenyl)methane,
1,1-bis-(4-hydroxyphenyl)ethane,
1,2-bis-(4-hydroxyphenyl)ethane,
1,1-bis-(4-hydroxy-2-chlorophenyl)ethane,
1,1-bis-(3-methyl-4-hydroxyphenyl)propane,
1,3-bis-(3-methyl-4-hydroxyphenyl)propane,
2,2-bis-(3-phenyl-4-hydroxyphenyl)propane,
2,2-bis-(3-isopropyl-4-hydroxyphenyl)propane
2,2-bis-(2-isopropyl-4-hydroxyphenyl)propane
2,2-bis-(4-hydroxynaphthyl)propane
2,2-bis-(4-hydroxyphenyl)pentane,
3,3-bis-(4-hydroxyphenyl)pentane,
2,2-bis-(4-hydroxyphenyl)heptane,
bis-(4-hydroxyphenyl)phenylmethane,
2,2-bis-(4-hydroxyphenyl)-1-phenyl-propane,
2,2-bis-(4-hydroxyphenyl)1,1,1,3,3,3,-hexafluoro-propane and the like;
di(hydroxaryl sulfones such as
bis-(4-hydroxyphenyl)sulfone,
2,4'-dihydroxydiphenyl sulfone,
5-chloro-2,4'-dihydroxydiphenyl sulfone,
5-chloro-4,4'-dihydroxydiphenyl sulfone, and the like;
di(hydroxyaryl)ethers such as
bis-(4-hydroxyphenyl)ether,
the 4,3'-, 4,2'-, 2,2'-, 2,3'-dihydroxyphenyl ethers,
4,4'-dihydroxy-2,6-dimethyldiphenyl ether,
bis-(4-hydroxy-3-isopropylphenyl)ether,
bis-(4-hydroxy-3-chlorophenyl)ether,
bis-(4-hydroxy-3-fluorophenyl)ether,
bis-(4-hydroxy-3-bromophenyl)ether,
bis-(4-hydroxynaphthyl)ether,
bis-(4-hydroxy-3-chloronaphthyl)ether, and
4,4'-dihydroxy-3,6-dimethoxydiphenyl ether.

Other useful diphenols are, for example, the naphthalene diols, and the mononuclear diphenols such as hydroquinone or resorcinol. Dihydroxydiphenyls such as 4,4'-biphenol are also very useful.

As herein used, the E term is defined as being the "residuum of the dihydric phenol" of course refers to the residue of the dihydric phenol after the removal of the two aromatic hydroxyl groups. Thus, as is readily seen, these aryl ether units contain groups of the residuum of dihydric phenol and the residuum of the benzenoid compound bonded through aromatic ether oxygen atoms.

Any dihalobenzenoid or dinitrobenzenoid compound or mixtures thereof can be employed in this invention which compound or compounds has the two halogens or nitro-groups bonded to benzene rings having an electron withdrawing group in at least one of the positions ortho or para to the halogen or nitro group. The dihalobenzenoid or dinitrobenzenoid compound can be either mononuclear, where the halogens or nitro groups are attached to the same benzenoid ring; or polynuclear where they are attached to different benzenoid rings, as long as there is an activating electron withdrawing group in the ortho or para position of that benzenoid nucleus. Fluorine and chlorine substituted benzenoid reactants are preferred; the fluorine compounds for fast reactivity and the chlorine compounds for their inexpensiveness. Fluorine substituted benzenoid compounds are most preferred, particularly when there is a trace of water present in the polymerization reaction system. However, this water content should be maintained below about one percent and preferably below 0.5 percent for best results.

An electron withdrawing group is employed as the activator group in these compounds. It should be, of course, inert under the reaction conditions, but otherwise its structure is not critical Preferred are the strongly activating groups such as the sulfone group

bonding two halogen or nitro substituted benzenoid nuclei, as in 4,4'-dichlorodiphenyl sulfone and 4,4'-difluorodiphenyl sulfone, although such other strong withdrawing groups hereinafter mentioned can also be used with equal ease.

The more powerful of the electron withdrawing groups give the fastest reactions and hence are preferred. It is further preferred that the ring contain no electron supplying groups on the same benzenoid nucleus as the halogen or nitro group; however, the presence of other groups on the nucleus or in the residuum of the compound can be tolerated.

The activating groups can be basically either of two types:
(a) monovalent groups that activate one or more halogens or nitro groups on the same ring such as another nitro or halo group, phenylsulfone, or alkylsulfone, cyano, trifluoromethyl, nitroso, and hetero nitrogen, as in pyridine.
(b) divalent groups which can activate displacement of halogens on two different rings, such as the sulfone group

the vinylene group

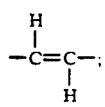

the sulfoxide group

the azo group —N=N—;
the saturated fluorocarbon groups

—CF$_2$CF$_2$CF$_2$;
organic phosphine oxides

where R''' is a hydrocarbon group and the ethylidene group

where A can be hydrogen or halogen.

If desired, the polymers may be made with mixtures of two or more dihalobenzenoid or dinitrobenzenoid compounds. Thus, the E' residuum of the benzenoid compounds in the polymer structure may be the same of different.

It is seen also that as used herein, the E' term defined as being the "residuum of the benzenoid compound" refers to the aromatic or benzenoid residue of the compound after the removal of the halogen atom or nitro group on the benzenoid nucleus.

Preferred aryl ether units of this invention are those prepared using the dihydric polynuclear phenols of the formulae (8)–(12) including the derivatives thereof which are substituted with inert substituent groups;

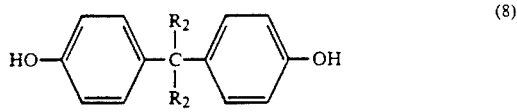

in which the R$_2$ groups represent independently hydrogen, lower alkyl, aryl and the halogen substituted derivatives thereof;

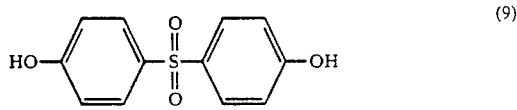

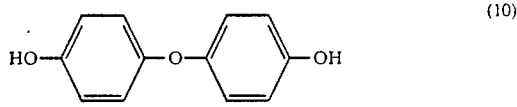

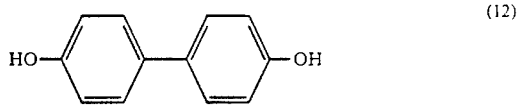

and substituted derivatives thereof.

It is also contemplated in this invention to use a mixture of two or more different dihydric phenols to accomplish the same ends as above. Thus, when referred to above, the —E— residuum in the polymer structure can actually be the same or different aromatic residua.

The preferred dihalobenzenoid compounds are (13), (14), (15), and (16); they may carry inert substituent groups.

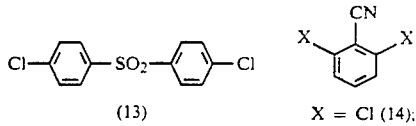

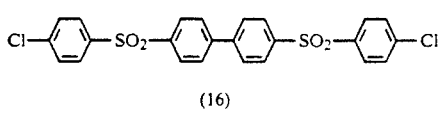

The preferred aryl ether blocks are those containing sulfone groups. Most preferred blocks are of the formulae (1), (2,), (17), and (18).

(1)

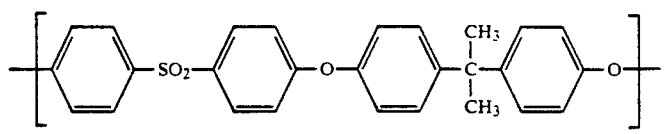

(2)

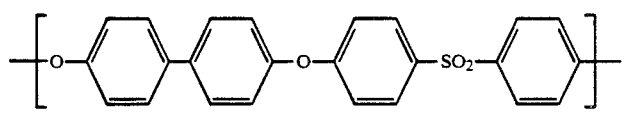

(17)

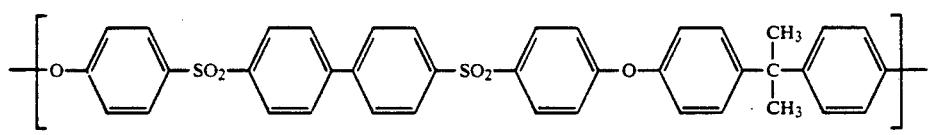

(18)

The aryl ether ketone blocks of the inert instant invention are comprised of ether oxygen and keto (carbonyl) groups interconnected by aromatic diradicals such as 1,4-phenylene. They may be characterized more specifically by one or more of the following formulae:

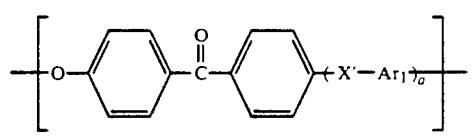

[I]

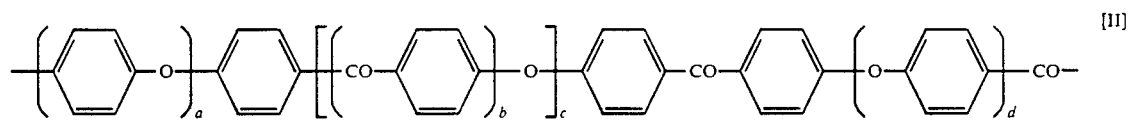

[II]

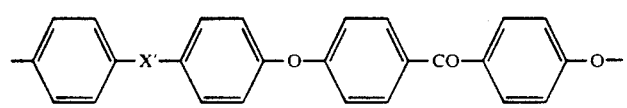

[III]

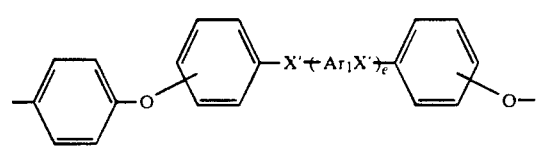

[IV]

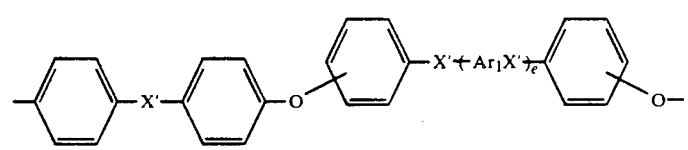

[V]

wherein $Ar_1$ is independently a divalent aromatic radical and is selected from, for example, phenylene, diphenyl ether diyl, buphenylene, or naphthylene, and the like, $X'$ is independently O, or a direct bond, and a is an integer of from 1 to 4; b, c, d and e are 0 to 1 and preferably d is 0 when b is 1.

Preferred aryl ether ketone blocks are those having the formulae:

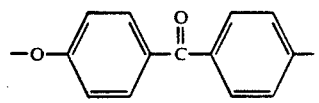

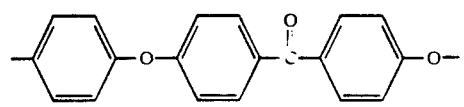

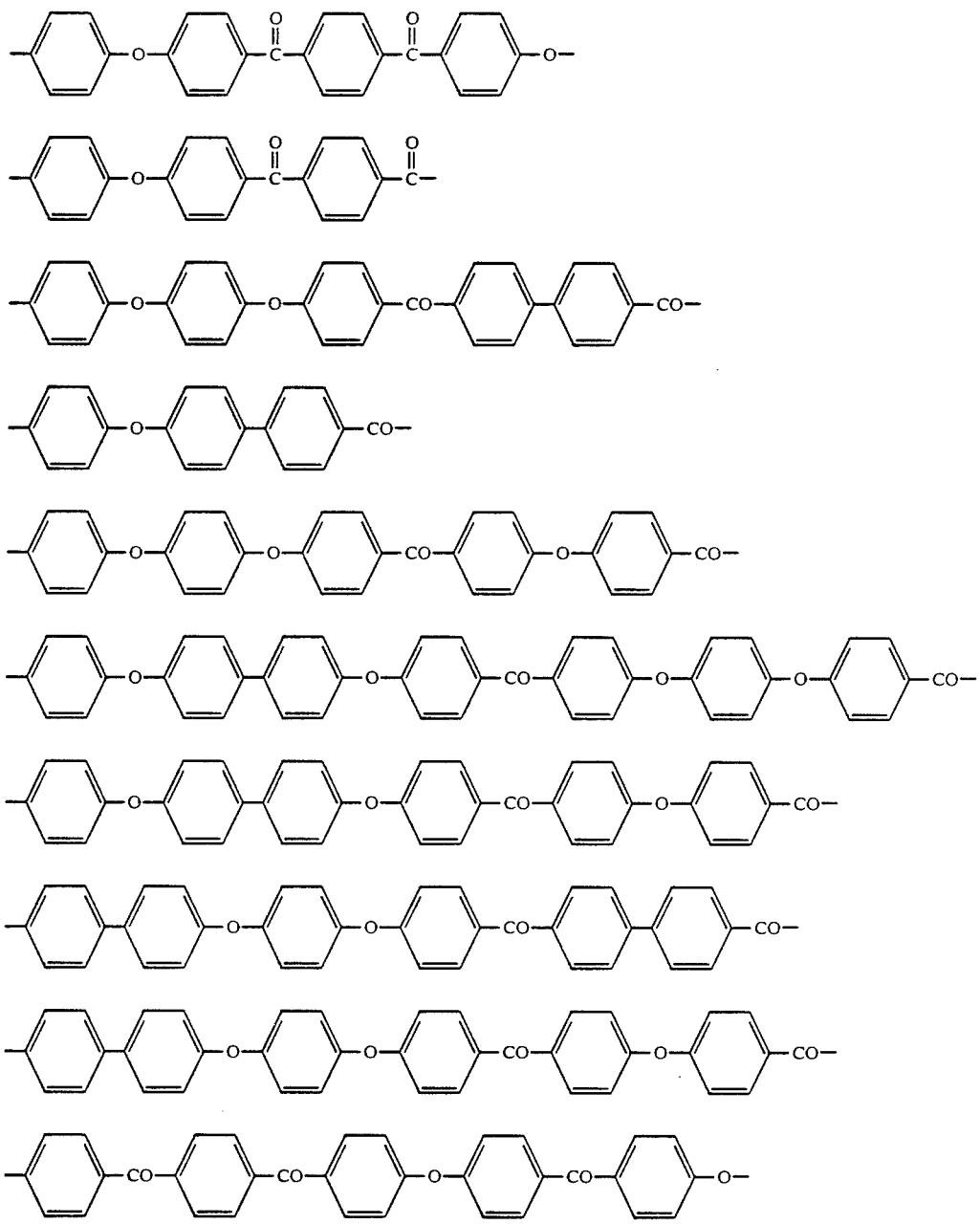

The block copolymers of the instant invention are prepared in two steps. They involve the preparation of a suitably (e.g., hydroxyl or halo) terminated poly(aryl ether ketone) oligomer via the electrophilic route; followed by its nucleophilic polycondensation to form the desired final copolymer. Obviously, mixtures of poly(aryl ether ketone) oligomers may also be employed.

The dihalo-terminated PAEK oligomers such as those containing repeating units of the formula

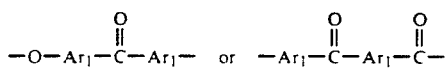

where $Ar_1$ is as defined previously, may be produced via electrophilic (Friedel-Crafts) reactions utilizing hydrogen fluoride-boron trifluoride catalysts as described, for example, in U.S. Pat. Nos. 3,953,400; 3,441,538; 3,442,857 and 3,516,966.

Additionally, the precursors may be prepared by Friedel-Crafts processes as described in, for example, U.S. Pat. Nos. 3,065,205; 3,419,462; 3,441,538; 3,442,857; 3,516,966 and 3,666,612. In these patents, a PAEK is produced by Friedel-Crafts polymerization techniques using Friedel-Crafts catalysts such as aluminum trichloride, zinc chloride, ferric bromide, antimony pentachloride, titanium tetrachloride, etc. and a solvent.

The precursor may also be prepared according to the processes as described in, for example, U.S. Defensive Publication T-103,703 and U.S. Pat. No. 4,396,755. In such processes, reactants such as:

(a) an aromatic monocarboxylic acid;

(b) a mixture of a least one aromatic dicarboxylic acid, and an aromatic compound, and (c) combinations of (a) and (b) are reacted in the presence of a fluoroalkane sulphonic acid, particularly trifluoromethane sulphonic acid.

Additionally, the dihalo PAEK block precursors of the following formulas:

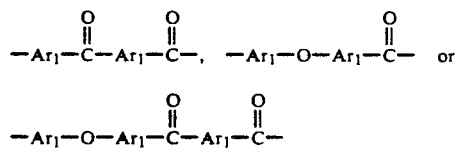

may also be prepared according to the process as described in U.S. Pat. 4,398,020. In such a process, (a) a mixture of substantially equimolar amounts of
i) at least one aromatic diacyl halide of formula YOC—Ar$_2$—COY where —Ar$_2$— is a divalent aromatic radical, such as 1,4-phenylene; 4,4'-biphenylene, terphenylene, naphthylene, anthracenylene, and the like; Y is halogen, preferably chlorine, and COY is an aromatically bound acyl halide group, which diacyl halide is polymerizable with at least one aromatic compound of (a) (ii), and ii) at least one aromatic compound of the formula H—Ar'—H wherein H—Ar'—H is an aromatic compound such as biphenyl, diphenoxybiphenyl, terphenyl, naphthalene, phenoxynaphthalene, anthracene, or diphenyl ether, and H is an aromatically bound hydrogen atom, which compound is polymerizable with at least one diacyl halide of (a)(i), or (b) at least one aromatic monoacyl halide of the formula H—Ar"—COY where H—Ar"—H is a divalent aromatic compound such as biphenyl, diphenyl ether, terphenyl, naphthalene, anthracene, diphenoxybiphenyl, diphenoxynaphthalene, diphenoxy-anthracene, and diphenoxybenzene, and H is an aromatically bound hydrogen atom, Y is halogen, preferably chlorine, and COY is an aromatically bound acyl halide group, which monoacyl halide is self-polymerizable, or (c) a combination of (a) and (b) is reacted in the presence of a fluoroalkane sulphonic acid.

Typical electrophilic preparations of dihalo-terminated poly(aryl ether ketones) are shown in equations [I]–[IV], where k is one or greater.

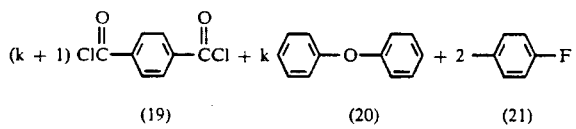

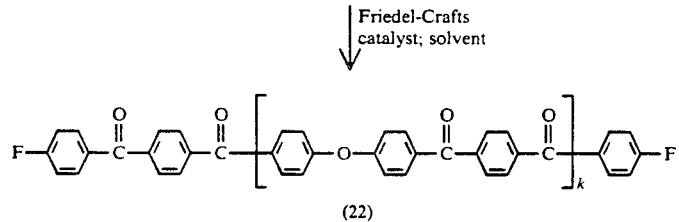

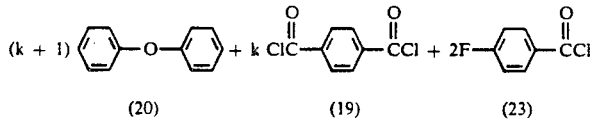

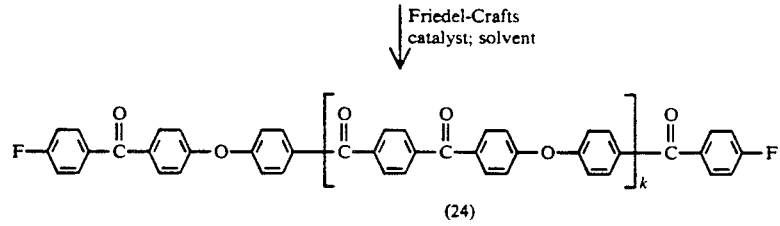

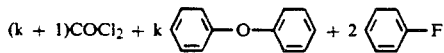

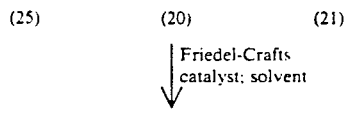

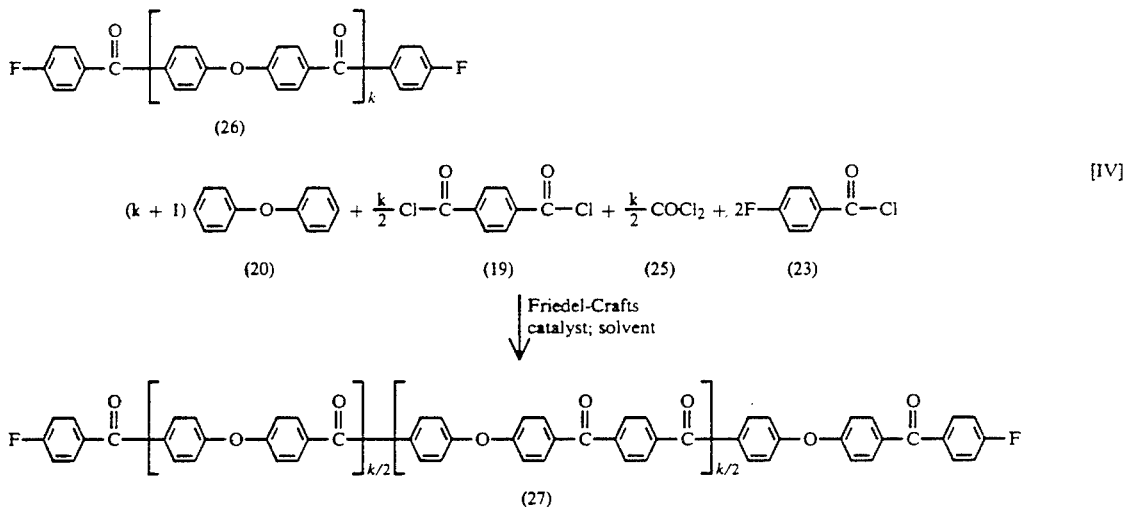

Thus the polyketone oligomers may be prepared by reacting an excess of either (i) or (ii):

(i) at least one electrophilic halo acylhalide or diacyl halide of the formula:

$$YOC-A-(CO)-_{a}-Y$$

where —A— is a direct bond or a divalent aromatic radical, Y is halogen and —COY is an acylhalide group, a is 0 or 1, and when a is zero, A must be a direct bond, polymerizable with at least one aromatic compound of (ii) below, and (ii) at least one aromatic compound of the formula:

$$H-Ar'''-H$$

where —Ar'''— is a divalent aromatic radical such as biphenylene, terphenylene, naphthylene, anthracenylene, diphenyl ether diyl, and the like, and H is an aromatically bound hydrogen atom, which compound is polymerizable with at least one halo acylhalide or diacyl halide of (i), above, accompanied or followed by the Friedel-Crafts reaction of the obtained intermediate with Z—Ar₃H if excess of (i) is used, or with Z—Ar₃COY if excess of (ii) is used. In the formulae above Z is halogen, preferably fluorine, Y is as described above and Ar₃ is a divalent, optionally alkyl or aryl substituted arylene group.

Specifically, the precursors may be prepared by reacting diphenyl ether, biphenyl, terphenyl, naphthalene, or anthracene, and, optionally, any of the well-known aromatic co-reactants such as diphenyl sulfide, dibenzofuran, thianthrene, phenoxathin, dibenzodioxine, phenodioxin, diphenylene, 4,4'-diphenoxybiphenyl, xanthone, 2,2'-diphenoxybiphenyl, diphenyl methane, 1,4-diphenoxybenzene, 1,3-diphenoxybenzene, 1-phenoxynaphthalene, 1,2-diphenoxynaphthalene, 4,4'-diphenoxybenzophenone, diphenoxy dibenzoyl benzene, 1,5-diphenoxynaphthalene, 1-phenoxyanthracene, 1,5-diphenoxyanthracene, 1,6-diphenoxyanthracene, and the like. Among these, diphenyl ether, 4,4'-diphenoxybiphenyl, diphenyl methane, 1,4-diphenoxybenzene, 4,4'-diphenoxy diphenyl ether, the mono- and the diphenoxynaphthalenes, and the mono- and the diphenoxyanthracenes are preferred.

Similarly, the following compounds are dicyl halides which may be used as reactants:
terphthaloyl chloride, isophthaloyl chloride,
thio-bis(4,4'-benzoyl chloride),
benzophenone-4,4'-di(carbonyl chloride),
oxy-bis(3,3'-benzoyl chloride),
diphenyl-3,3'-di(carbonyl chloride), carbonyl-bis(3,3'-benzoyl chloride),
sulfonyl-bis(4,4'-benzoyl chloride),
sulfonyl-bis(3,3'-benzoyl chloride),
sulfonyl-bis(3,4'-benzoyl chloride),
thio-bis(3,4'-benzoyl chloride),
diphenyl-3,4'-di(carbonyl chloride),
oxy-bis[4,4'-(2-chlorobenzoyl chloride)],
naphthalene-1,6-di(carbonyl chloride),
naphthalene-1,5-di(carbonyl chloride),
naphthalene-2,6-di(carbonyl chloride),
oxy-bis[7,7'-naphthalene-2,2'-di(carbonyl chloride)],
thio-bis[8,8'-naphthalene-1,1'-di(carbonyl chloride)],
7,7'-binaphthyl-2,2'-di(carbonyl chloride),
diphenyl-4,4'-di(carbonyl chloride),
carbonyl-bis[7,7'-naphthalene-2,2'-di(carbonyl chloride)],
sulfonyl-bis[6,6'-naphthalene-2,2'-di(carbonyl chloride)],
dibenzofuran-2,7-di(carbonyl chloride),
anthracene-1,5-di(carbonyl chloride) and the like.

Illustrative of suitable acyldihalides include carbonyl chloride (phosgene), carbonyl bromide, carbonyl fluoride and oxaloyl chloride.

Most preferably diphenyl ether, 4,4-diphenoxybenzophenone, biphenyl and/or naphthalene, are reacted with terphthaloyl chloride, isophthaloyl chloride and/or phosgene, followed or accompanied by reaction with an end-capping agent such as (21) or (23).

The preferred Friedel-Crafts catalysts are aluminum chloride, antimony pentachloride and ferric chloride. Other Friedel-Crafts catalysts, such as aluminum bromide, boron trifluoride, zinc chloride, antimony trichloride, ferric bromide, titanium tetrachloride, and stanic chloride, can also be used. In the preferred embodiment, excess of up to 100 mole percent of the acid catalyst is used.

The polymerization is generally carried out in the presence of a solvent. The preferred organic solvent is 1,2-dichloroethane. Other solvents such as symmetrical tetrachloroethane, o-dichlorobenzene, hydrogen fluoride, methylene chloride, trichloromethane, trichloroethylene, or carbon disulfide may be employed. Cosolvents such as nitromethane, nitropropane, dimethyl formamide, sulfolane, etc. may be used. Concentrations as low as 3 to as high as 40 weight percent may be used. Generally lower concentrations are preferred when high molecular weight polymers are being prepared. Higher concentrations are preferably used when oligomers are prepared.

The reaction may be carried out over a range of temperatures which are from about $-40°$ C. to about $160°$ C. In general, it is preferred to carry out the reaction at a temperature in the range of $-10°$ to about $30°$ C. In some cases it is advantageous to carry out the reaction at temperatures above $30°$ C. or below $-10°$ C. Most preferably, the reactions are carried out at temperatures below about $0°$ C. The reactions may be carried out at atmospheric pressure although higher or lower pressures may be used. Reaction times vary depending on the reactants, etc. Generally, reaction times of up to 6 hours and longer are preferred.

Hydrolysis of the dihalo-terminated oligomers, using methods known in the art (for example, in a mixture of dimethyl sulfoxide and water, diphenyl sulfone and water, aqueous amide aprotic solvents) yields the dihydroxy oligomers.

The above dihalo- and dihydroxy-terminated oligomers are described in detail in the copending U.S. Pat. application Ser. No. 039,310, by R. A. Clendinning et al., titled "Poly(aryl ether ketone) Block Copolymers", filed on Apr. 16, 1987, commonly assigned The nucleophilic polymerization of the poly(aryl ether ketone) oligomers to the final block copolymers can be performed using two approaches:

(a) the oligomer is reacted with the poly(aryl ether), preferably poly(aryl ether sulfone) forming reagents [i.e. the bisphenol(s) and the dihalo- or dinitrobenzenoid compound(s)] in an aprotic solvent, in the presence of a base; or (b) using the above conditions (i.e. base/aprotic solvent), a suitably terminated poly(aryl ether), preferably poly(aryl ether sulfone) oligomer is first prepared and then reacted with the preformed poly(aryl ether ketone) segment.

Approach (b) is preferred since it yields materials with better defined blocks (i.e., less randomization via transetherification). Note that both reactions of (b) may be run as a one-pot operation. Also, as is obvious to those skilled in the art, the preformed poly(aryl ether) oligomer in (b) must be dihydroxy-terminated if it is to be reacted with a dihalo end-capped poly(aryl ether ketone); and vice versa. It is understood that more than one poly(aryl ether ketone) oligomer, and/or bisphenol, and/or dihalo- or dinitrobenzenoid compound, and/or a suitably terminated poly(aryl ether) oligomer may be used in the polymerizations outlined above.

The preparation of a block copolymer via approach (a) is illustrated in equation [V]. Equations [VI] and [VII] show the preparation of a dihydroxy- and a dichloro-terminated polysulfone using an excess of the appropriate reagent. Note that some transetherification can take place in reaction [V]. Therefore, formula (28) represents an ideal structural composition.

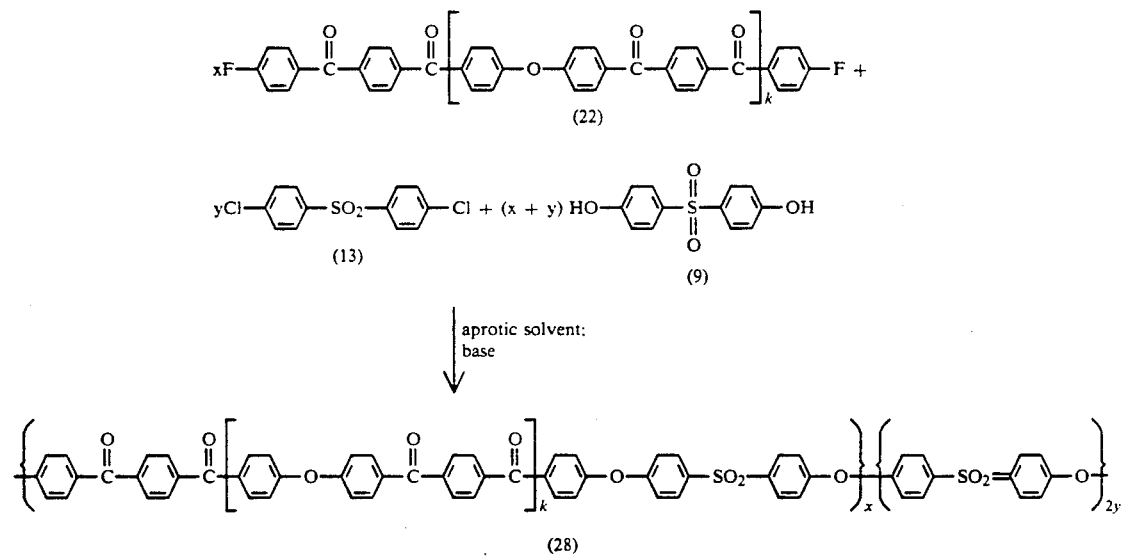

In the formulae above, k is as previously defined; x and y are such that the weight ratio of the poly(aryl ether ketone) and poly(aryl ether sulfone) blocks be within the limits of 5:95 to 95:5.

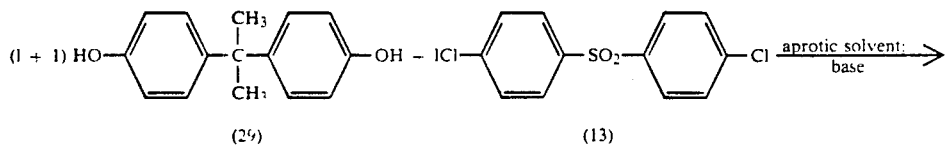

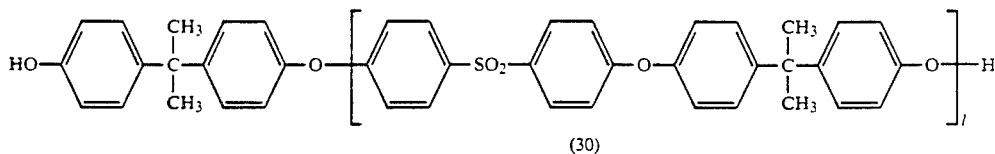

(30)

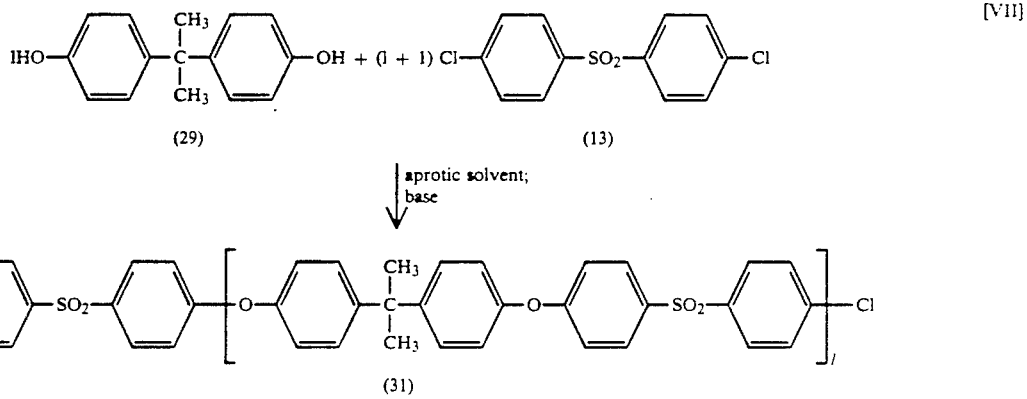

[VII]

In the above equations, l is one or greater.

The preparation of the block copolymers of the instant invention is conducted at high temperatures, in an aprotic solvent, in the presence of a base. The bases useful in the polymerizations may be one of the following (note that base systems resulting from various combinations of (a)-(e) may also be used):

(a) a mixture of sodium carbonate or bicarbonate with a second alkali metal carbonate or bicarbonate wherein the alkali metal of the second carbonate or bicarbonate has a higher atomic number than that of sodium. The amount of the second alkali metal carbonate or bicarbonate is such that there is from 0.001 to about 0.20 gram atoms of the second alkali metal per gram atom of sodium.

The higher alkali metal carbonates or bicarbonates are thus selected from the group consisting of potassium, rubidium and cesium carbonates and bicarbonates. Preferred combinations are sodium carbonate or bicarbonate with potassium carbonate or cesium carbonate.

As stated above, the amount of the second (higher) alkali metal carbonate or bicarbonate employed is such that there are 0.001 to about 0.2 gram atoms of the alkali metal of higher atomic number per gram atom of sodium.

Thus, when using a mixture of carbonates, e.g., sodium carbonate and cesium carbonate, there should be 0.1 to about 20 moles of cesium carbonate per 100 moles of sodium carbonate. Likewise, when using a mixture of a bicarbonate and a carbonate, e.g., sodium bicarbonate and potassium carbonate, there should be 0.05 to 10 moles of potassium carbonate per 100 moles of sodium bicarbonate.

A mixed carbonate, for example sodium and potassium carbonate, may be employed as the second alkali metal carbonate. In this case, where one of the alkali metal atoms of the mixed carbonate is sodium, the amount of sodium in the mixed carbonate should be added to that in the sodium carbonate when determining the amount of mixed carbonate to be employed.

Preferably, from 0.005 to 0.1 gram atoms of the alkali metal of the second alkali metal carbonate or bicarbonate per gram atom of sodium is used.

(b) a combination of sodium carbonate and/or bicarbonate and an alkali metal halide selected from potassium, rubidium or cesium fluoride or chloride, or combinations thereof. In a preferred embodiment from about 0.001 to about 0.5 atoms of alkali metal (derived from the alkali metal halide) is used for each phenol group.

The sodium carbonate or bicarbonate and potassium fluoride are used such that the ratio of potassium to sodium therein is from about 0.001 to about 0.5, preferably from about 0.01 to about 0.25, and most preferably from about 0.02 to about 0.20.

(c) a combination of (1) lithium and/or an alkaline earth metal carbonate; and (2) sodium, potassium, rubidium, or cesium carbonate. Mixtures of carbonates of groups (1) and/or (2) can be used. Also, bicarbonates may be employed instead of the carbonates.

The ratio of the carbonates (1) to (2) can vary from 40:60 to 99:1 and is preferably in the range of 80:20 to 95:5. Calcium, strontium, and barium carbonates are the preferred alkaline earth metal carbonates. Particularly preferred are calcium carbonate (chalk) and the double calcium/magnesium carbonate (dolomite). As far as the carbonates of group (2) are concerned, sodium and potassium carbonates are preferred.

(d) a combination of sodium or an alkaline earth metal carbonate or bicarbonate and a potassium, rubidium or cesium salt of an organic acid. Salts of any organic acid are useful. Thus, one may use the potassium, rubidium, or cesium salts of aliphatic linear or branched acids such as: formic, acetic, propionic, butyric, isobutyric, pentanoic, hexanoic, heptanoic, octanoic, nonanoic, decanoic, 2-methyl-butyric, 3,4-dimethyl-pentanoic, 4,4-dimethyl hexanoic, 2-ethylheptanoic, 3-propyl-5,6-dimethyl nonanoic and other similar acids.

Salts of halo-substituted aliphatic acids such as monochloro-, dichloro-, and trichloroacetic, 2-chloropropionic, 3,5-dichloroheptanoic, bromoacetic, 3-fluorobutyric, and 3,3,3-trichloro propionic acids.

Salts of aromatic mono- or polynuclear acids such as benzoic, toluic, 3,4-dimethylbenzoic, 2-chlorobenzoic, 3,4-dichlorobenzoic, 2-bromobenzoic, 2-chloro-4-methylbenzoic, 2-fluoro-3-ethylbenzoic);

Other alkyl and/or halo-substituted benzoic acids, the naphthalene carboxylic acids, alkyl-substituted naphthalene carboxylic acids such as 3-methyl-naphthalene-1-carboxylic acid, 6-ethyl-naphthalene-2-carboxylic acid; halo-substituted naphthalene carboxylic acids such as 4-chloro-naphthalene-2-carboxylic acid, phenanthrene and anthracene carboxylic acids and the like.

Salts of arylaliphatic acids such as phenylacetic, diphenyl acetic, 1-naphthyl acetic, 2-naphthyl acetic, 4-chlorophenyl acetic, 4-methylphenyl acetic, 3-bromo-1-naphthyl acetic, 4-chloro-2-naphthyl acetic, 3-(6-chloro-1-naphthyl)propionic, 3-(4-ethylphenyl))-butyric, 3-methyl-4-(2-ethyl-4-chlorophenyl)butyric, 3-phenyl-hexanoic, and 7-phenylnonanoic acids.

Salts of heterocyclic carboxylic acids such as furane-2-carboxylic, furane-3-carboxylic, thiophene-2-carboxylic, thiophene-3-carboxylic, the pyridine, quinoline and isoquinoline carboxylic acids.

Salts of alkyl, aryl, and halo-substituted heterocyclic acids such as 2-methylfurane-3-carboxylic, 4-chloropyridine-2-carboxylic, 2-methyl-4-oxazole carboxylic, and 2-propyl-pyrazine-3-carboxylic acids.

Salts of dicarboxylic acids such as oxalic, malonic, succinic, adipic, suberic, azelaic, α-bromo-glutaric, β,β'-dimethyl-glutaric, α,α'-dichlorosuberic, maleic, and fumaric acids.

Salts of aromatic and heterocyclic dicarboxylic acids such as phthalic, isophthalic, terephthalic, naphthalene-1,2-dicarboxylic, naphthalene-2,3-dicarboxylic, naphthalene-1,5; 1,6; 1,7; 1,8; 2,4; 2,5; and 2,6-dicarboxylic, pyridine-2,3-dicarboxylic, furane-2,3-dicarboxylic acids and the like.

Salts of aliphatic, aromatic, and heterocyclic sulfonic and sulfinic acids such as methane sulfonic, ethane sulfonic, propane sulfonic, benzene sulfonic, benzene sulfinic, 1-naphthalene sulfonic, 2-naphthalene sulfonic, 1-naphthalene sulfinic, 1,8-naphthalene disulfonic, 2,6-naphthalene disulfonic, 4-methyl-benzene sulfinic, p-toluene sulfonic, 3,4-dichloro-benzene sulfonic, 6-chloro-naphthalene-1-sulfonic, quinoline-2-sulfonic, 4-pyridine sulfonic, 2-thiophene sulfonic, 3-thiophene sulfonic, 3-methyl-2-furane sulfinic, 3-propyl-2-furane-sulfonic acids and the like.

Salts of aliphatic, aromatic, and heterocyclic phosphonic and phosphinic acids such as methane phosphonic, ethane phosphonic, benzene phosphinic, benzene phosphonic, 1-naphthalene phosphonic, 2-naphthalene phosphonic, 1-naphthalene phosphinic, 1,8-naphthalene diphosphonic, 2,6-naphthalene diphosphonic, 4-methyl-benzene phosphinic, 4-ethyl-benzene phosphonic, 3,4-dichloro-benzene phosphonic, 3,4-dibromobenzene phosphonic, 3-chloro-4-methyl benzene phosphonic, 6-chloro-1-naphthalene phosphonic, 2-quinoline phosphonic, 2-thiophene phosphonic, 3-thiophene phosphonic, 3-thiophene phosphinic, 3-chloro-2-furane phosphinic, 3-propyl-2-furane phosphonic acids and the like.

Mixed salts such as for example mixtures of potassium and rubidium acetates or mixtures of potassium acetate and potassium benzene sulfonate and the like can also be used. The preferred salts are postassium formate, acetate, propionate, oxalate, benzoate, benzene sulfonate and p-toluene sulfonate.

The sodium or alkaline earth metal carbonate or bicarbonate and the potassium, rubidium, or cesium organic salt are used such that the ratio of the higher alkali metal to sodium or alkaline earth metal therein is from about 0.001 to about 0.5, preferably from about 0.001 to about 0.20, and most preferably from 0.01 to about 0.1. In another preferred embodiment, from 0.001 to about 0.5 atoms of alkali metal (derived from the alkali metal organic salt) is used for each phenol group. Of course, it is well known to those skilled in the art that cesium is a more active metal and potassium is a less active metal, so that less cesium and more potassium are used. It is preferred that the ratio of carbonate and bicarbonate anions to the phenolic groups be about 0.5 to 1.0, respectively. However, higher and lower ratios are also possible.

(e) a combination of sodium or an alkaline earth metal carbonate or bicarbonate and a lithium, sodium or alkaline earth metal salt of an organic acid, optionally in combination with a catalytic amount of a potassium, cesium, or rubidium salt catalyst. The salts of organic acids that are useful are the same as those listed above. Preferred salts are the formates, acetates, propanoates, benzoates, benzene sulfonates and p-toluene sulfonates. Sodium salts are most preferred.

The polycondensation is preferably conducted in the presence of an essentially stoichiometric amount of sodium or alkaline earth metal carbonate or sodium or alkaline earth metal bicarbonate, i.e., the ratio of carbonate and bicarbonate anions to the phenolic groups should be about 0.5 and 1.0, respectively. However, a deficiency or an excess of carbonate or bicarbonate can also be used; the amount of the lithium, sodium, or alkaline earth metal salt is in the range of from about 0.01 to about 0.5 moles per mole equivalent of sodium or alkaline earth metal carbonate or bicarbonate; and preferably from about 0.02 to about 0.3 moles per mole equivalent. The amount of the lithium, sodium, or alkaline earth metal salt can be adjusted to obtain the desired reaction rate and, hence, these salts may be used in amounts greater or lesser than the ranges stated herein.

As indicated above, this latter polymerization can be catalyzed by the addition of a catalytic amount of a potassium, cesium or rubidium salt. In this process variation, the polycondensation of a dihydroxy-aromatic monomer or oligomer with a dinitro or dihaloaromatic monomer or oligomer is, once again, conducted in the presence of an essentially stoichiometric amount of sodium or alkaline earth metal carbonate or bicarbonate, although a deficiency or an excess of carbonate or bicarbonate can be used. The amount of the lithium, sodium, or alkaline earth metal salt is from about 0.005 to about 0.5 moles per mole equivalent of sodium or alkaline earth metal carbonate or bicarbonate; and preferably from about 0.01 to about 0.2 moles per mole equivalent. The amount of the higher alkali metal salt catalyst is from about 0.00001 to about 0.05 gram-atom of the higher alkali metal per mole equivalent of sodium or alkaline earth metal carbonate or bicarbonate; and such that the ratio of gram-atoms of the higher alkali metal to the mole equivalent of the lithium, sodium, or alkaline earth metal (organic) salt is less than one. Where the preferred amount of the lithium, sodium, or alkaline earth metal salt is used, it is preferred to employ from about 0.00002 to about 0.01 gram-atoms of the higher alkali metal per mole equivalent of sodium or alkaline earth metal carbonate or bicarbonate. The gram-atom ratio of the higher alkali metal to the combined total gram equivalents of lithium, sodium and alkaline earth metal, (carbonate, bicarbonate, and organic salt) should be less than about 0.05, preferably less than about 0.005, and most preferably, less than about 0.001.

The amount of the lithium, sodium or alkaline earth metal salt and the amount of the higher alkali metal salt catalyst can be adjusted separately or simultaneously to obtain the desired reaction rate and, hence, these salts may be used in amounts greater or lesser than the ranges stated above.

The lithium, sodium, or alkaline earth metal salts of organic acids that are useful are the same as those listed above. Preferred salts are the formates, acetates, propanoates, benzoates, benzene sulfonates and p-toluene sulfonates. Sodium salts are most preferred.

The higher alkali metal salt catalysts are of the general formula $$MX''$$

where M is potassium, cesium or rubidium; $X''$ is the residue of an organic acid (vide supra); the residue of an inorganic acid such as carbonate, bicarbonate, halide and the like; the residue of a phenol such as phenoxide, naphthoxide, halo- and/or alkyl-substituted phenoxides, naphthoxides and the like; the residue of an alcohol such as methoxide, ethoxide, propoxide, n-butoxide, t-butoxide and the like; and a hydroxyl group. The salts wherein $X''$ is an acetate, propanoate, oxalate, trichloroacetate, benzoate, benzene sulfonate, p-toluene sulfonate, trifluoromethane sulfonate, methane sulfonate, carbonate, bicarbonate, fluoride, chloride, and phenoxide are preferred. Potassium salts are the most preferred.

All of the reactions discussed above may be advantageously performed in the presence of small amounts of cupric or cuprous ions. A wide range of copper compounds may be used, both cupric and cuprous compounds being usable in accordance with the present invention. The copper compounds used should be stable under the polymerization conditions and it is preferred that the copper compounds be essentially anhydrous. Copper compounds which can be used include cuprous chloride, cupric chloride, cupric acetylacetonate, cuprous acetate, cupric hydroxide, cuprous oxide, cupric oxide, basic cupric carbonate and basic cupric chloride. Although a basic copper compound may be used, it is still necessary to use an at least stoichiometric amount of the sodium or alkaline earth metal carbonate or bicarbonate.

The proportion of the copper compound used is preferably not more than one mole percent based on the total reagents employed; preferably, less than 0.4 mole percent of the copper compound based on the reagents is used. It is generally desirable to employ at least 0.1 mole percent of the copper derivative. Obviously, the optimum amount of the cupric or cuprous ions will depend on the reagents and on the type of the copper derivative employed.

In all of the embodiments of this invention, the total amount of sodium or alkaline earth metal carbonate and/or bicarbonate and of the alkali and alkaline earth metal salt should be such that there is at least one atom or atom equivalent of total alkali and alkaline earth metal for each phenol group, regardless of the anion (carbonate, bicarbonate, halide, carboxylate, etc . . . ).

Preferably, from about 1 to about 1.2 atoms or atom equivalents of alkali or alkaline earth metal for each phenol group are used. An excess of total alkali and alkaline earth metal may be employed. Hence, there may be about 1 to about 1.7 atoms or atom equivalents of alkali and alkaline earth metal per phenol group. While the use of a large excess of alkali and alkaline earth metal may give rise to faster reactions, there is the attendant risk of cleavage of the resulting polymer, particularly when using high temperatures and/or the more active alkali metal salts.

The reaction is carried out by heating a mixture of one or more of the poly(aryl ether ketone) oligomers, one or more bisphenols and one or more dihalobenzenoid or dinitrobenzenoid compounds at a temperature of from about 100° to about 400° C. The reaction is conducted in the presence of added base as hereinabove defined.

The sodium or alkaline earth metal carbonate, bicarbonate or halide and the organic salts should be anhydrous although, if hydrated salts are employed where the reaction temperature is relatively low, e.g., 100° to 250° C., the water should be removed, e.g., by heating under reduced pressure, prior to reaching the reaction temperature. It is also preferred that the higher alkali metal salt catalysts be anhydrous; however, these latter salts are employed in amounts such that the hydrated forms can also be used.

Where high reaction temperatures (>250° C.) are used, it is not necessary to dehydrate the carbonate, bicarbonate or halide and the organic salts first as any water is driven off rapidly before it can adversely affect the course of the reaction. Optionally, an entraining organic medium such as toluene, xylene, chlorobenzene, and the like can be used to remove the water from the reaction mixture.

The bisphenol(s) the poly(aryl ether ketone) oligomers and the dinitro- or dihalobenzenoid compound(s) should be used in substantially equimolar amounts when maximum molecular weight is sought. However, a slight excess, up to 5 mole percent of the dihalide or the dinitro compound, or of the diphenol, may be employed, if desired.

The reaction may be carried out in the presence of an inert solvent, or partially in the absence of a solvent, or in the absence of a solvent.

Preferably, a solvent is employed and is an aliphatic or aromatic sulphoxide or sulphone of the formula

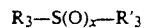

where x is 1 or 2 and $R_3$ and $R_3'$ are alkyl or aryl groups and may be the same or different. $R_3$ and $R'_3$ may together form a divalent radical. Preferred solvents include dimethyl sulphoxide, dimethyl sulphone, sulpholane (1,1 dioxothiolan), or aromatic sulphones of the formula

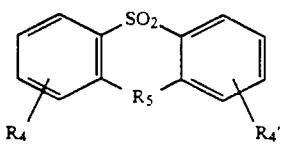

where $R_5$ is a direct link, an oxygen atom or two hydrogen atoms (one attached to each benzene ring) and $R_4$ and $R'_4$, which may be the same or different, are hydrogen atoms or phenyl groups. Examples of such aromatic sulphones include diphenylsulphone, ditolyl sulphone, tolylphenyl sulphone, dibenzothiophene dioxide, phenoxathiin dioxide and 4-phenylsulphonyl biphenyl. Diphenylsulphone is the prefered aromatic sulfone solvent. Other very useful and preferred solvents that may be used, include N,N-dimethyl formamide, N-methyl-2-pyrolidone, N,N-dimethylacetamide, and N-cyclohexyl pyrolidone. In another embodiment, the reaction is started in a relatively low boiling polar aprotic solvent such as dimethyl formamide, dimethylacetamide, dimethyl sulfoxide, N-methylpyrolidone, and the like. Heating at reflux results in the formation of low molecular weight product with attendant precipitation. The solvent may be removed and the low molecular weight product may be advanced if desired, by solid-state polymerization, i.e., by heating to a temperature in the range of from about 200° to about 400° C.; preferably, an inert atmosphere is maintained during this latter step.

The reaction temperature is in the range of from about 100° to about 400° C. and will depend on the nature of the reactants and the solvent, if any, employed. The reactions are preferably carried out at ambient pressure. However, higher or lower pressures can also be used. The reaction is generally carried out in an inert atmosphere.

For the production of some block copolymers, it may be desirable to commence reaction at one temperature, e.g., at about 150° to 200° C. and to increase the temperature as the reaction ensues. This is particularly necessary when making high molecular weight polymers having only a low solubility in the solvent. Thus, there it is desirable to increase the temperature progressively to maintain the polymer in solution as its molecular weight increases.

The block copolymers of the instant invention exhibit a reduced viscosity of from about 0.05 to about 5.0, and preferably, from about 0.1 to about 2.0 dl/g as measured in an appropriate solvent at 25° C.

The block copolymers of this invention may include mineral fillers such as carbonates including chalk, calcite and dolomite; silicates including mica, talc, wollastonite; silicon dioxide; glass spheres; glass powders; aluminum; clay; quartz; and the like. Also, reinforcing fibers such as fiberglass, carbon fibers, and the like may be used. The polymers may also include additives such as titanium dioxide; thermal stabilizers; ultraviolet light stabilizers, plasticizers, and the like.

The materials of this invention may be fabricated into any desired shape, i.e., molding, coatings, films, or fibers. They are also useful in blends with a variety of polymers such as aromatic poly(aryl ethers), aromatic poly(aryl ether ketones), polyimides, poly(ester-imides), poly(amide-imides), poly(ether imides), polyarylates, polycarbonates, poly(arylate-carbonates) poly(alkylene phthalates), polyamides, poly(hydroxy ethers), styrenics, polyolefins, and the like. These blends may contain from about 5 to about 95 weight percent of the material of the instant invention and from about 95 to about 5 weight percent of the other polymer.

EXAMPLES

The following examples serve to give specific illustrations of the practice of this invention but they are not intended in any way to limit the scope of this invention.

A. Dihalo-terminated Poly(aryl ether ketone) Oligomers

A.1 Preparation of Oligomer (32)

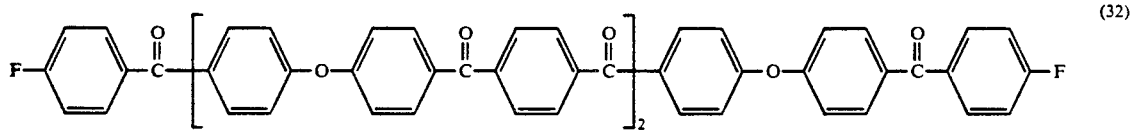
(32)

A 500 ml 4-neck round bottom flask equipped with a mechanical stirrer (Teflon blade), nitrogen inlet, thermometer, solids addition funnel, and gas outlet to a NaOH scrubber was purged with dry nitrogen and charged with:
190 ml (240 g) of 1,2-dichloroethane,
21.25 g(0.1340 moles) of 4-fluorobenzoyl chloride,
34.04 g (0.200 moles) of diphenyl ether, and
27.20 g (0.1340 moles) of terephthaloyl chloride.

The addition funnel was charged with 75.04 g, (0.5628 moles) of aluminum chloride. The solution was cooled to <5° C. (ice water bath) and the aluminum chloride added at a rate such that the reaction temperature did not rise above 5° C. The reaction mixture was stirred with cooling for 6 hours, during which it became homogeneous. The viscous reaction mixture was pumped slowly using nitrogen pressure through a ⅜" polyethylene cannulation tube into a 2-liter 3-neck round bottom flask (equipped with a heating mantle, mechanical stirrer, Claisen head, thermometer, Dean-Stark trap, and condenser) containing 400 ml of water at 85° C. Dichloroethane was removed by distillation during the transfer. Once the transfer was complete, the slurry was heated to 95° C. and kept 15 minutes to remove traces of dichloroethane, then allowed to cool to 45 C. The crude product was recovered by vacuum filtration, rinsed on the filter with methanol, then with deionized water until the rinsings were neutral, then again with methanol, and allowed to air dry.

The product was then added to a solution of 9 ml conc. HCl and 155 ml of methanol and the resulting slurry was heated at reflux for 90 minutes with stirring. The product was recovered by vacuum filtration, rinsed with deionized water until the rinsings were neutral, then rinsed with methanol and allowed to air dry. The air dried product was dried overnight in a vacuum at 100° C. to give 63.8 g (94%) of the oligomer (32).

Analysis: calculated 78.10% C, 3.97% H, 14.19% 0, 3.74% F; found 78.06% C, 4.07% H, 14.08% 0, 3.76% F.

A.2 Preparation of Oligomer (33)

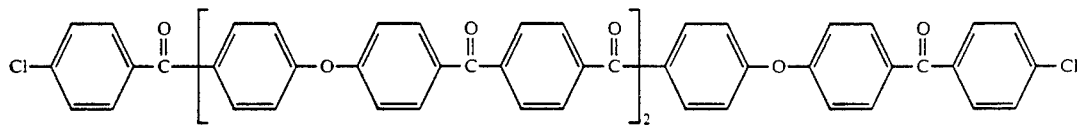

(33)

The material was prepared using the procedure of A.1 except that 23.45 gms (0.1340 moles) of 4-chlorobenzoyl chloride were substituted for the 4-fluorobenzoyl chloride. Sixty-four grams (91%) of oligomer (33) were obtained.

Analysis: calculated 75.65% C, 3.85% H, 13.74% 0, 6.77% Cl; found 75.89% C, 3.82% H, 13.86% 0, 6.88% Cl.

A.3. Preparation of Oligomer (34)

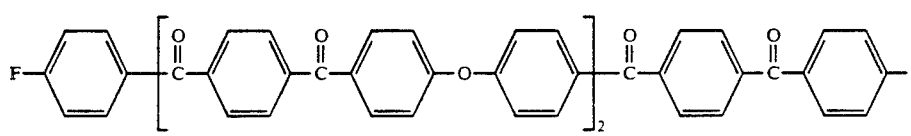

(34)

The apparatus used for the preparation of oligomer (32) was charged with
152 ml, (192 g) of 1,2-dichloroethane,
19.53 g (0.3200 moles) of nitromethane,
18.25 g (0.1072 moles) of diphenyl ether, and
32.48 g (0.1600 moles) of terephthaloyl chloride.

The addition funnel was charged with 93.5 g (0.7001 moles) of aluminum chloride. The solution was cooled (ice water bath) to <5° C. and the aluminum chloride was added at a rate such that the reaction temperature did not rise above 6° C. The mixture was stirred for 20 minutes, then the solids addition funnel was replaced with a regular addition funnel, which was charged with 10.30 g (0.1072 moles) of fluorobenzene. The fluorobenzene was added intermittently over a period of 90 minutes. The cooling bath was removed and the mixture was stirred at room temperature for 20 hours, during which it became homogeneous. The product was worked up using the procedure described in A.1.

Analysis: calculated 4.12% F; found 3.96% F.

A.4. Preparation of Oligomer (35)

and the aluminum chloride was added at a rate such that the temperature did not exceed about 5° C. Once the addition was complete, the cooling bath was replaced with an ice water bath and the mixture was stirred for 6 hours. The reaction mixture was allowed to come to room temperature and stirred for 17 hours. The reaction mixture was transferred slowly into a 5-liter flask containing 3 liters 1% aqueous HCl. Dichloroethane was removed by distillation. The product was recovered by vacuum filtration, washed with deionized water, and transferred to a 2-liter flask containing 1 liter 5% aqueous HCl. The slurry was heated at reflux for 2 hours. The product was recovered by vacuum filtration, washed with deionized water, and transferred to a blender containing 500 ml deionized water. The mixture was stirred in the blender for 5 minutes, the product recovered and washed with deionized water; the extraction in the blender was repeated once with water and twice with methanol. After vacuum filtration, the product was dried overnight in a vacuum at 100° C. The dried product was extracted at reflux for 2 hours with a 5:95 v/v pentanedione/acetone solution (350 ml), filtered, and washed with acetone. The extraction was repeated using 350 ml of the above pentanedione acetone solution. The product was recovered by filtration, washed with acetone, and dried overnight in a vacuum, to give 34.59 g (95%) of the oligomer (35); RV (conc. $H_2SO_4$, 1 g/100 ml., 25° C.) 0.14 dl/g.

Analysis: calculated 1.98% F; found 1.91% F.

Procedure A.4.2.

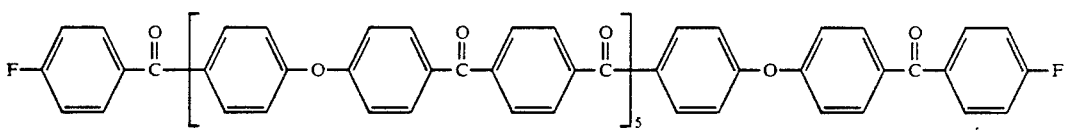

(35)

Two procedures, A.4.1. and A.4.2. were used. They are outlined below.

Procedure A.4.1.

A 500 ml 4-neck round bottom flask equipped with mechanical stirrer, thermometer, solids addition funnel, nitrogen inlet, gas outlet to NaOH scrubber was purged with dry nitrogen, then charged with:
19.39 g (0.0955 moles) of terephthaloyl chloride,
19.50 g (0.1146 moles) of diphenyl ether,
6.10 g (0.0385 moles) of 4-fluorobenzoyl chloride, and
148 ml (183 g) of 1,2-dichloroethane.

The solids addition funnel was charged with 39.74 g (0.298 moles) of aluminum chloride. The reaction solution was cooled to 0° C. using a dry ice/methanol bath, The apparatus described above was purged with dry nitrogen and the flask was charged with:
20.30 g (0.1000 moles) of terephthaloyl chloride,
20.42 g (0.1200 moles) of diphenyl ether,
14.64 g (0.2398 moles) of nitromethane,
6.34 g (0.0399 moles) of 4-fluorobenzoyl chloride, and
149 ml (184 g) of 1,2-dichloroethane.

The solids addition funnel was charged with 73.61 g (0.5520 moles) of aluminum chloride. The solution was cooled in a dry ice/acetone bath and the aluminum chloride added at a rate such that the temperature did not rise above about 5° C. After the addition was complete, the cooling bath was replaced by an ice water bath and the mixture stirred for 6 hours, during which it became homogeneous. The cooling bath was removed and the reaction mixture stirred for 16 hours. The product was worked up as described in Procedure A.1. to give 35.17 g (92%) of oligomer (35); RV (conc. H₂SO₄, 1 g/100 ml., 25° C.) 0.15 dl/g.

Analysis: calculated 1.98% F; found 1.93% F.

A.5. Preparation of Oligomer (36)

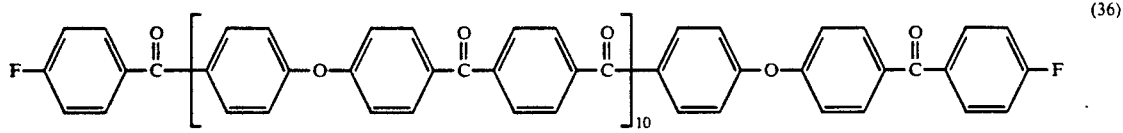

Three procedures, A.5.1., A.5.2., and A.5.3. were used. They are described below.

Procedure A.5.1.

The apparatus was the same as that described for oligomer (35), except that a one-liter reaction flask was substituted for the 500 ml reaction flask; the system was purged with dry nitrogen and charged with:
20.30 g (0.1000 moles) of terephthaloyl chloride,
18.61 g (0.1093 moles) of diphenyl ether,
3.22 g (0.0203 moles) of 4-fluorobenzoyl chloride, and
790 ml (976 g) of 1,2-dichloroethane.

The addition funnel Was charged with 38.13 g (0.2859 moles) of aluminum chloride. The reaction solution was cooled to −5° C. (dry ice/acetone bath) and the aluminum chloride was added at a rate such that the reaction temperature did not rise above about 5 C. Once the addition was complete, the cooling bath was replaced by an ice water bath and the reaction mixture was stirred for 6 hours. The cooling bath was removed and the reaction mixture was stirred at room temperature for 17 hours. The product was worked up using the procedure described for oligomer (35); RV (conc. H₂SO₄, 1 g/100 ml., 25° C.) 0.20 dl/g.

Analysis: calculated 1.11% F; found 1.04% F.

Procedure A.5.2.

The apparatus described for the preparation of oligomer (35) was purged with dry nitrogen and charged with:
20.30 g (0.1000 moles) of terephthaloyl chloride,
18.72 g (0.1100 moles) of diphenyl ether,
3.17 g (0.0200 moles) of 4-fluorobenzoyl chloride,
9.32 g (0.2200 moles) of lithium chloride, and
139 ml (172 g) of 1,2-dichloroethane.

The addition funnel was charged with 67.47 g (0.5060 moles) of aluminum chloride. The solution was cooled to −3° C. (dry ice/acetone bath) and the aluminum chloride was added at a rate such that the reaction temperature did not rise above about 5° C. Once the addition was complete, the cooling bath was replaced by an ice water bath and the reaction mixture was stirred for 6 hours during which it became homogeneous. The cooling bath was removed and the reaction mixture was stirred at room temperature for 16 hours. The product was worked up using the procedure described for oligomer (35); giving 31.32 g (92%) of oligomer (36); RV (conc. H₂SO₄, 1 g/100 ml., 25° C.) 0.23 dl/g.

Analysis calculated 1.11% F; found 1.05% F.

Procedure A.5.3.

The apparatus described for the preparation of oligomer (35) was purged with dry nitrogen and charged with:
20.30 g (0.1000 moles) of terephthaloyl chloride,
18.72 g (0.1100 moles) of diphenyl ether,
13.42 g (0.2199 moles) of nitromethane,
3.17 g (0.0171 moles) of 4-fluorobenzoyl chloride, and
139 ml (171 g) of 1,2-dichloroethane.

The addition funnel was charged with 67.47 g (0.5060 moles) of aluminum chloride The solution was cooled to −5° C. (dry ice/acetone bath) and the aluminum chloride was added at a rate such that the reaction temperature did not rise above about 5° C. Once the addition was complete, the cooling bath was replaced by an ice water bath and the reaction mixture was stirred for 6 hours during which time it became homogeneous. The cooling bath was removed and the reaction mixture was stirred at room temperature for 16 hours. The product was worked up using the procedure described for oligomer (35); RV (conc. H₂SO₄, 1 g/100 ml., 25° C.) 0.21 dl/g.

Analysis calculated 1 11% F; found 1.07% F.

A.6. Preparation of Oligomer (37)

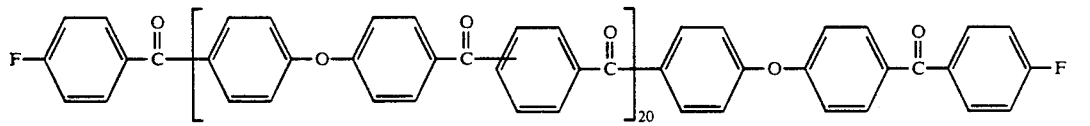

Three procedures, A.6.1., A.6.2, and A.6.3 were used. They are described below.

Procedure A.6.1

The apparatus described for the preparation of oligomer (35) was purged with dry nitrogen and charged with:
190 ml (240 g) of 1,2-dichloroethane,
2.03 g (0.0100 moles) of isophthaloyl chloride,
38.57 g (0.1900 moles) of terephthaloyl chloride,
35.74 g (0.2100 moles) of diphenyl ether, and
3.17 g (0.0200 moles) of 4-fluorobenzoyl chloride.

The addition funnel was charged with 72.80 g (0.5460 moles) of aluminum chloride. The solution was cooled to 0° C. (ice water bath) and the aluminum chloride was added at a rate such that the reaction temperature did not rise above about 10° C. The reaction mixture was stirred with cooling for 4.5 hours, during which time it became extremely viscous. The product was worked up using the procedure described for oligomer (35); to give 56.84 g (89%) of oligomer (37); RV (conc. H₂SO₄, 1 g/100 ml., 25° C.) 0.33 dl/g.

Analysis: calculated 0.59% F; found 0.58% F.

Procedure A.6.2.

The apparatus described for the preparation of oligomer (36) (procedure A.5.1) was purged with dry nitrogen and charged with:
700 ml (880 g) of 1,2-dichloroethane,
1.02 g (0.00502 moles) of isophthaloyl chloride,
19.28 g (0.0950 moles) of terephthaloyl chloride,
17.87 g (0.1050 moles) of diphenyl ether,
1.59 g (0.0100 moles) of 4-fluorobenzoyl chloride, and
50.47 g (0.4200 moles) of sulfolane.

The addition funnel was charged with 98.00 g (0.7350 moles) of aluminum chloride. The solution was cooled to below 5° C. (ice water bath) and the aluminum chloride was added at a rate such that the temperature of the reaction mixture did not rise above about 5° C. The reaction mixture was stirred with cooling for 6 hours, then the cooling bath was removed and the mixture was stirred at room temperature for 16 hours. The reaction mixture became homogeneous during this time. The product was worked up as described for oligomer (35); to give 25.70 g (80%) of oligomer (37); RV (conc. $H_2SO_4$, 1 g/100 ml., 25° C.) 0.35 dl/g.

Analysis: calculated 0.59% F; found 0.61% F.

Procedure A.6.3.

The apparatus described above was purged with dry nitrogen and charged with:
700 ml (880 g) of 1,2-dichloroethane,
1.02 g (0.00502 moles) of isophthaloyl chloride,
19.29 g (0.0950 moles) of terephthaloyl chloride,
17.87 g (0.1050 moles) of diphenyl ether, and
1.59 g (0.0100 moles) of 4-fluorobenzoyl chloride.

The addition funnel was charged with 56.00 g (0.4200 moles) of aluminum chloride. The solution was cooled to below 5° C. (ice water bath) and the aluminum chloride charged at a rate such that the reaction temperature did not rise above about 7° C. The reaction mixture was stirred with cooling for 6 hours, then worked up as described for oligomer (35); to give 23.76 g (74%) of oligomer (37); RV (conc. $H_2SO_4$, 1 g/100 ml., 25° C.) 0.34 dl/g.

Analysis: calculated 0.59% F; found 0.58% F.

Note: In the formulae (32)–(37) the integers (2, 5, 10 and 20) refer obviously to a weighted average of the number of repeat units.

B. Polymerizations

B.1 General Procedure

A 250 ml 4-neck flask equipped with a mechanical stirrer (stainless steel blade), nitrogen inlet, thermometer, Claisen adapter, addition funnel, Dean-Stark trap, condenser, and heating mantles (upper and lower) was purged with nitrogen and charged with the appropriate reagents (amounts listed below). Xylene (20 ml) was charged in the addition funnel. Once charged, the mixture was heated. The xylene was added when the mixture began to liquify and stirring was begun. Simultaneously, about 7 ml of fresh xylene were placed in the Dean-Stark trap. When the temperature reached about 175° C. distillation of xylene took place with continuous recycling. The xylene was drained dropwise from the trap and the temperature was gradually increased to 200° C. ($\approx$ 15 minutes). The mixture was maintained at 200° C. for 30 minutes, with addition of some xylene (if necessary) to maintain a steady reflux. The mixture was then heated to 250° C., draining xylene dropwise from the trap as necessary to increase the temperature. The mixture was maintained at 250° C. for 30 minutes, with addition of some xylene (if necessary) to maintain a steady reflux. The mixture was then heated to 300° C. At 265°–275° C., all of the xylene was removed from the Dean-Stark trap. The mixture was maintained at 300° C. until it became viscous, then poured into an aluminum pan. After cooling and solidification, the reaction mass was broken up and ground to a powder. It was then extracted with a 1:1 mixture by volume of methanol/acetone at reflux (700 ml, 1.5 hours), with methanol at reflux (2 times 700 ml, 1.5 hours each time), with 5 percent by weight of aqueous HCl at reflux (700 ml, 1.5 hours each time), with deionized water at reflux (2 times 700 ml, 1.5 hours each time), and with a 1:1 mixture by volume of methanol/acetone at reflux (700 ml, 1.5 hours). The final product was recovered by vacuum filtration and washed with a 1:1 mixture by volume of methanol/acetone; it was then allowed to air dry, followed by drying in vacuum at 100° C. for 3 days.

B.2. Specific Examples

The following copolymers were prepared using the procedure described under B.1, in some cases with minor modifications which are described below.

Example 1

The polymers contained blocks (32) (5 mole percent; 10 weight percent) and the polysulfone blocks of structure (1). Preparative details were:
(1a). 2.11 g (0.02 moles) of oligomer (32);
9.66 g (0.038 moles) of 4,4'-difluorodiphenyl sulfone;
10.01 g (0.04 moles) of 4,4'-dihydroxydiphenyl sulfone (4,4'-bisphenol-S);
4.00 g (0.04 moles) of calcium carbonate;
0.393 g (0.004 moles) of potassium acetate; and
61 g of diphenyl sulfone.

The reaction mixture was kept at 300° C. for 50 minutes. The polymer had a reduced viscosity (RV) (1 g/100 ml; conc. $H_2SO_4$, 25° C.) of 1.62 dl/g.

(1b). The amounts of all reagents were the same as in (1a). The reaction was carried out as described in B.1., except that the 250° C. hold was omitted. The reaction time at 300° C. was 20 minutes. The polymer was isolated as described in B.1. except that an extraction with refluxing methanol (700 ml, 1.5 hours) was substituted for the first extraction with a 1:1 mixture by volume of methanol/acetone, and an extraction with 2 percent by weight aqueous HCl at reflux (700 ml, 1.5 hours) was substituted for the extraction with refluxing 5 percent by weight aqueous HCl. RV (1 g/100 ml; conc. $H_2SO_4$, 25° C.) was 1.12 dl/g.

(1c). The amounts of oligomer (32), 4,4'-difluorodiphenyl sulfone, 4,4'-bisphenol-S, and diphenyl sulfone were the same as in (1a). The base used was:
4.24 g (0.04 moles) of sodium carbonate; and
0.20 g (0.00344 moles) of potassium fluoride.

The reaction time at 300° C. was 60 minutes. RV (1 g/100 ml; conc. $H_2SO_4$, 25° C.) was 1.27 dl/g.

Example 2

Polymers having the same composition as the polymers of Example 1 were prepared, except that the amount of oligomer (32) was in all cases 10 mole percent (19 weight percent). The amounts of reagents and conditions used were:
(2a). 4.22 g (0.004 moles) of oligomer (32);

9.15 g (0.036 moles) of 4,4'-difluorodiphenyl sulfone;
10.01 g (0.04 moles) of 4,4'-bisphenol-S;
4.00 g (0.04 moles) of calcium carbonate;
0.393 g (0.004 moles) of potassium acetate; and
65 g of diphenyl sulfone.

The reaction time at 300° C. was 45 minutes. RV (1 g/100 ml; conc. $H_2SO_4$, 25° C.) was 1.88 dl/g.

(2b). The amounts of all reagents were the same as in (2a); the polymerization and product isolation were carried out as described in (1b). The reaction time at 300° C. was 60 minutes. RV (1 g/100 ml; conc. $H_2SO_4$, 25° C.) was 1.03 dl/g.

(2c). The amounts of oligomer (32), 4,4'-difluorodiphenyl sulfone, 4,4'-bisphenol-S, and diphenyl sulfone were the same as in (2a). The base used was
4.24 g (0.0400 moles) of sodium carbonate, and
0.30 g (0.0052 moles) of potassium fluoride.

The reaction time at 300° C. was 45 minutes. RV (1 g/100 ml; conc. $H_2SO_4$, 25° C.) was 1.23 dl/g.

Example 3

Polymers having the same composition as the material of Example 1 were prepared, except that the amount of oligomer (32) was in all cases 20 mole percent (33 weight percent).

The amounts of reagents and the conditions used were:
(3a). 7.04 g (0.00667 moles) of oligomer (32);
6.78 g (0.0267 moles) of 4,4'-difluorodiphenyl sulfone;
8.34 g (0.0333 moles) of 4,4'-bisphenol-S;
4.00 g (0.0400 moles) of calcium carbonate;
0.39 g (0.0040 moles) of potassium acetate; and
62 g of diphenyl sulfone.

The reaction time at 300° C. was 30 minutes. RV (1 g/100 ml; conc. $H_2SO_4$, 25° C.) was 1.83 dl/g.

(3b). The amounts of oligomer (32), 4,4'-difluorodiphenyl sulfone, 4,4'-bisphenol S, and diphenyl sulfone were the same as in (3a). The base used was:
3.34 g (0.0333 moles) of calcium carbonate; and
0.327 g (0.00333 moles) of potassium acetate.
The polymerization and product isolation were carried out as described in (1b).

The reaction time at 300° C. was 30 minutes. RV (1 g/100 ml; conc. $H_2SO_4$, 25° C.) was 1.41 dl/g.

(3c). The amounts of oligomer (32), 4,4'-difluorodiphenyl sulfone, 4,4'-bisphenol-S, and diphenyl sulfone were the same as in (3a). The base used was:
3.53 g (0.0333 moles) of sodium carbonate; and
0.168 g (0.00289 moles) of potassium fluoride.
The reaction time at 300° C. was 50 minutes. RV (1 g/100 ml; conc. $H_2SO_4$, 25° C.) was 1.22 dl/g.

(3d). The amounts of all reagents were the same as in (3c). The polymerization was carried out as described in B.1., except that the hold at 250° C. was omitted. The reaction time at 300° C. was 60 minutes. The ground reaction mixture was extracted with refluxing methanol (3 times, 700 ml, 1.5 hours each time), refluxing deionized water (2 times, 700 ml, 1.5 hours each time), and a 1:1 by volume mixture of methanol/acetone at reflux (700 ml, 1.5 hours). The polymer was recovered and dried as described in B.1. RV (1 g/100 ml; conc. $H_2SO_4$, 25° C.) was 1.03 dl/g.

(3e). The amounts of oligomer (32); 4,4'-difluorodiphenyl sulfone; 4,4'-bisphenol-S; sodium carbonate; and diphenyl sulfone were the same as in (3c); sodium acetate (0.273 g, 0.00333 moles) Was part of the base system employed. The polymerization and product isolation were carried out as described in (3d). The reaction time at 300° C. was 90 minutes. RV (1 g/100 ml; conc. $H_2SO_4$, 25° C.) was 1.15 dl/g.

(3f). 6.98 g (0.00667 moles) of oligomer (32);
7.66 g (0.0267 moles) of 4,4'-dichlorodiphenyl sulfone;
8.34 g (0.0333 moles) of 4,4'-bisphenol-S;
0.53 g (0.0050 moles) of sodium carbonate;
3.92 g (0.0284 moles) of potassium carbonate; and
62 g of diphenyl sulfone.

The polymerization and product isolation were carried out as described in (3d). The reaction time at 300° C. was 120 minutes. RV (1 g/100 ml; conc. $H_2SO_4$, 25° C.) was 0.92 dl/g.

Example 4

A polymer having the same composition as the polymer of Example 1, except that the amount of oligomer (32) was 30 mole percent (43 weight percent) was prepared. The amounts of reagents and the conditions used were:
9.50 g (0.00903 moles) of oligomer (32);
5.34 g (0.0210 moles) of 4,4'-difluorodiphenyl sulfone;
7.51 g (0.0300 moles) of 4,4,-bisphenol-S;
3.00 g (0.0300 moles) of calcium carbonate;
0.29 g (0.0030 moles) of potassium acetate; and
63 g of diphenyl sulfone.

The polymerization was carried out as described in B.1. except that the hold at 250 C was omitted. Reaction time at 300° C. was 60 minutes. RV (1 g/100 ml; conc. $H_2SO_4$, 25° C.) was 1.64 dl/g.

Example 5

A polymer having the same composition as the material in Example 1, except that the amount of oligomer (32) was 40 mole percent (52 weight percent) was prepared. The amounts of reagents and conditions used were:
10.76 g (0.0102 moles) of oligomer (32);
3.89 g (0.0153 moles) of 4,4'-difluorodiphenyl sulfone;
6.38 g (0.0255 moles) of 4,4,-bisphenol-S;
2.55 g (0.0255 moles) of calcium carbonate;
0.25 g (0.0025 moles) of potassium acetate; and
60 g of diphenyl sulfone.

The polymerization was carried out as described in B.1. except that the hold at 250° C. was omitted. Reaction time at 300° C. was 75 minutes. RV (1 g/100 ml; conc. $H_2SO_4$, 25° C.) was 1.51 dl/g.

Example 6

A polymer having the same composition as the polymer of Example 1, except that the amount of oligomer (32) was 60 mole percent (65 weight percent) was prepared. The amounts of reagents and conditions used were:
13.40 g (0.0127 moles) of oligomer (32);
2.15 g (0.00846 moles) of 4,4'-difluorodiphenyl sulfone;
5.30 g (0.0212 moles) of 4,4'-bisphenol-S;
2.12 g (0.0212 moles) of calcium carbonate;
0.21 g (0.0021 moles) of potassium acetate; and
60 g of diphenyl sulfone.

The polymerization was carried out as described in B.1. except that the hold at 250° C. was omitted. Reaction time at 300° C. was 70 minutes. RV (1 g/100 ml; conc. $H_2SO_4$, 25° C.) was 1.52 dl/g.

Example 7

Polymers having the same composition as the polymer of Example 1, except that the amount of oligomer

(32) was 100 mole percent (80 weight percent) were prepared. The amounts of reagents and conditions used were:

(7a) 18.85 g (0.0180 moles) of oligomer (32);

films having excellent transparency. Films from (7a) and (7b) were translucent and crystalline. DSC analysis indicated that polymer (7a) had a melting point of 318° C.

TABLE 1

|  | Poly(ether sulfone) homo-polymer(1) | Example | | | | | |
|---|---|---|---|---|---|---|---|
|  |  | 1a | 1b | 1c | 2a | 2b | 2c |
| Weight % Poly-aryl ether ketone) Oligomer (32) | 0 | 10 | 10 | 10 | 19 | 19 | 19 |
| Glass-transition Temperature (°C.) | 235 | — | 222 | — | — | 216 | — |
| Tensile Modulus (×1000 psi) | 244 | 251 | 279 | 245 | 247 | 278 | 250 |
| Tensile strength (psi) | 11,400 | 11,600 | 11,200 | 11,200 | 11,000 | 11,200 | 10,900 |
| Elongation (%) |  |  |  |  |  |  |  |
| Yield | — | 7.7 | — | — | — | — | — |
| Break | 7.2 | 8.6 | 6.7 | 7.5 | 7.1 | 6.3 | 8.0 |
| Pendulum Impact (ft. lbs/in$^3$) | 71 | 51 | 34 | 83 | 87 | 35 | 90 |
| Molding Temperature (°F.) | 660 | 750 | 750 | 750 | 750 | 660 | 750 |

|  | Example | | | | | | | |
|---|---|---|---|---|---|---|---|---|
|  | 3a | 3c | 3e | 4 | 5 | 6 | 7a | 7b |
| Weight % Poly-aryl ether ketone) Oligomer (32) | 33 | 33 | 33 | 43 | 52 | 65 | 80 | 80 |
| Glass-transition Temperature (°C.) | — | — | 206 | 197 | 192 | 182 | 172 | — |
| Tensile Modulus (×1000 psi) | 261 | 253 | 266 | 263 | 273 | 272 | — | 355 |
| Tensile strength (psi) | 11,900 | 10,800 | 10,700 | 11,600 | 11,500 | 11,400 | — | 14,800 |
| Elongation (%) |  |  |  |  |  |  |  |  |
| Yield | 7.5 | — | 7.7 | 7.8 | 6.8 | 7.6 | — | — |
| Break | 39.0 | 7.0 | 8.8 | 15.0 | 32.0 | 14.0 | — | 60.0 |
| Pendulum Impact (ft. lbs/in$^3$) | 151 | 81 | 54 | 109 | 113 | 111 | — | 43 |
| Molding Temperature (°F.) | 750 | 750 | — | 750 | 750 | 750 | — | 750 |

4.50 g (0.0180 moles) of 4,4'-bisphenol-S;
1.91 g (0.0180 moles) of sodium carbonate;
0.089 g (0.0015 moles) of potassium fluoride; and
70 g of diphenyl sulfone.

The polymerization was carried out as described in B.1. except that the reaction mixture was heated directly to 300° C., omitting the holds at 200° C. and 250° C. The reaction time at 300° C. was 75 minutes. The ground reaction mixture was extracted with refluxing acetone (2 times, 700 ml, 1.5 hours each time), refluxing deionized water (2 times, 700 ml, 1.5 hours each time), and refluxing acetone (700 ml, 1.5 hours). The final product was recovered by vacuum filtration, washed with acetone, and dried as described in B.1. RV (1 g/100 ml; conc. H$_2$SO$_4$, 25° C.) was 1.18 dl/g.

(7b). 18.2 g (0.0172 moles) of oligomer (32);
4.25 g (0.0170 moles) of 4,4'-bisphenol-S;
1.80 g (0.0170 moles) of sodium carbonate;
0.089 g (0.0015 moles) of potassium fluoride; and
66 g of diphenyl sulfone.

The polymerization and product isolation were carried out as described in (7a). The reaction time at 300° C. was 50 minutes. RV (1 g/100 ml; conc. H$_2$SO$_4$, 25° C.) was 1.12 dl/g.

Mechanical properties and glass transition temperatures of the polymers prepared are listed in Table I. The data were obtained on molded films (mold temperatures are given in the table). All materials except polymers (7a) and (7b) were amorphous when molded and gave All Tg's were measured by DSC.

Polymers 1c, 2c, 3c and 6 were submitted to stress-crack resistance testing. The tests were performed as follows: the polymer sample was compression molded into a 20 mil plaque; strips ½ inch wide, were shear cut from the films; a strip was wrapped with a cotton patch saturated with a given solvent. In order to prevent evaporation of the solvent, this was then wrapped with aluminum foil. The strip was then placed in the jaws of the Instron apparatus.

(2inch gate length) and the tensile strength was measured at a rate of 0.02 inch per minute, at room temperature. The higher the tensile strength the better, obviously, the stress-crack resistance of the polymer.

Results on "as molded" amorphous transparent films are shown in Table II. For comparison purposes similar data were obtained for a sample of poly(ether sulfone) of structure (1).

TABLE II

| Stress-Crack Resistance Results - Amorphous Films | | |
|---|---|---|
|  | Tensile Strength at 0.02"/minute (psi) | |
| Sample | Acetone | Methyl Ethyl Ketone |
| Poly(ether sulfone) (1) (0 wt. % PAEK) | 300 | 100 |
| Polymer 1c (10 wt. % PAEK) | 1,000 | 1,100 |
| Polymer 2c | 1,000 | 900 |

TABLE II-continued

Stress-Crack Resistance Results - Amorphous Films

| Sample | Tensile Strength at 0.02"/minute (psi) | |
|---|---|---|
| | Acetone | Methyl Ethyl Ketone |
| (19 wt. % PAEK) | | |
| Polymer 3c | 1,700 | 2,100 |
| (33 wt. % PAEK) | | |

Several samples were annealed (250° C., 30 minutes) and tested. Results are listed in Table III.

TABLE III

Stress-Crack Resistance Results - Annealed Films

| Sample | Tensile Strength at 0.02"/minute (psi) | |
|---|---|---|
| | Acetone | Methyl Ethyl Ketone |
| Polymer 3c (33 wt. % PAEK) | 1,300 | 1,000 |
| Polymer 6 (65 wt. % PAEK) | 5,200 | 4,800 |

Tables II and III clearly show that the incorporation of poly(aryl ether ketone) segments into poly(aryl ether sulfones) improves the solvent resistance of the latter. The improvement is observed with both the unannealed (amorphous and transparent) as well as the annealed materials.

It is interesting to note that polymers 1-6 were amorphous as molded. Polymer 7 (80 weight percent PAEK) was crystalline. Annealing (30 minutes at 250° C.) resulted in the development of crystallinity in material 6 (65 weight percent of PAEK) and it became translucent. The other films remained transparent (essentially amorphous) upon annealing. Table IV summarizes the Tg and Tm data of the novel copolymers; for comparison purposes, the Tg and Tm values for poly(ether sulfone) and for two poly(aryl ether ketones) are also included.

TABLE IV

Glass-Transition (Tg) and Melting Point (Tm) Data

| Polymer | Tg(°C.) | Tm(°C.) | Remarks |
|---|---|---|---|
| Poly(ether sulfone) (1) (0 wt. % PAEK) | 235 | — | — |
| Polymer 1b (10 wt. % PAEK) | 222 | — | — |
| Polymer 2b (19 wt. % PAEK) | 216 | — | — |
| Polymer 3e (33 wt. % PAEK) | 206 | — | — |
| Polymer 4 (43 wt. % PAEK) | 197 | — | — |
| Polymer 5 (52 wt. % PAEK) | 192 | — | — |
| Polymer 6 (65 wt. % PAEK) | 182 | 309 | Amorphous as made; developed crystallinity on annealing for 30 min. at 250° C. |
| Polymer 7a (80 wt. % PAEK) | 172 | 318 | Crystalline as made. |
| 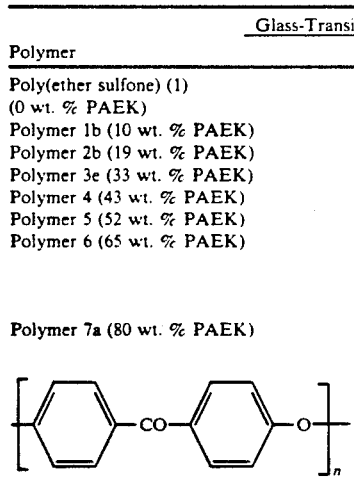 | 152 | 365 | Crystalline as made. |
| | 141 | 335 | Crystalline as made. |

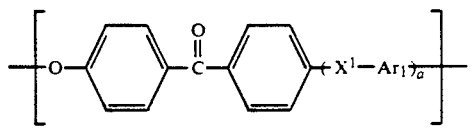
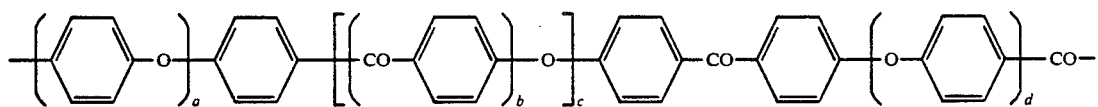
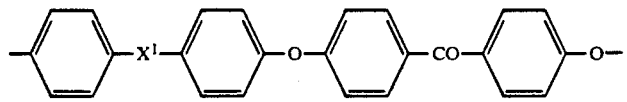
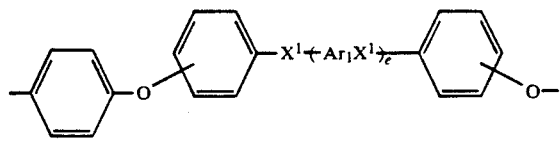
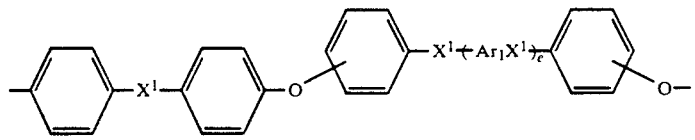
wherein $Ar_1$ is a divalent aromatic radical which is independently phenylene, diphenyl ether diyl, biphenylene or naphthylene; $X'$ is independently O,
or a chemical bond; as is an integer of from 1 to 4; and b, c, d and e are 0 to 1.
14. A block copolymer as defined in claims 1 or 13 where the poly(aryl ether ketone) blocks are one or more of the formulae
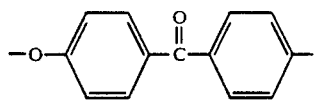
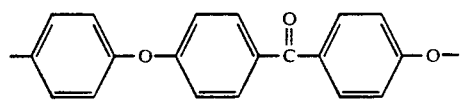
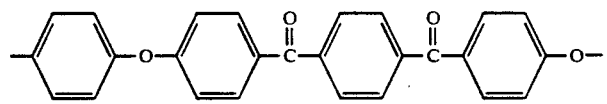
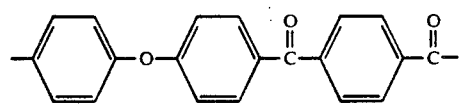
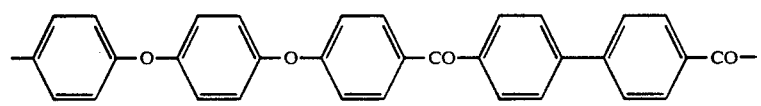
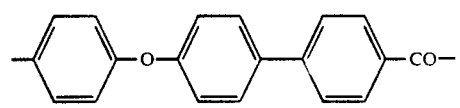

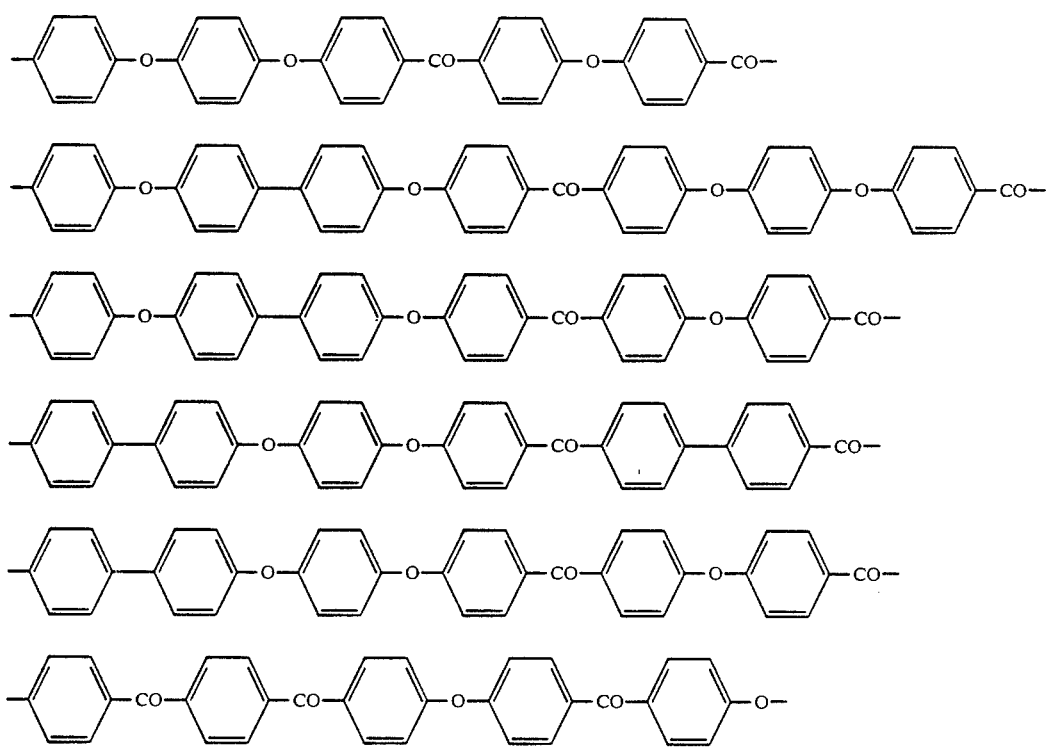

What is claimed is:

1. A block copolymer of the formula

where A is a poly(aryl ether) block having no ketone linkages, B is a poly(aryl ether ketone) block, m is one or greater; the molecular weight of the blocks A and B is at least 500, and the weight ratio of the two blocks is in the range of about 5:95 to about 95:5.

2. A block copolymer as defined in claim 1 where the poly(aryl ether) blocks A are of the formula

where E is the residuum of at least one dihydric phenols and E' is the residuum of at least on benzenoid compound having an inert electron withdrawing group in at least one of the positions ortho and para to the valence bonds.

3. A block copolymer as defined in claim 2 where the dihydric phenol is of the formula

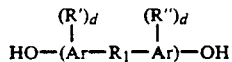

where Ar is a divalent aromatic group, R' and R" are inert substituents which are independently $C_1$ to $C_4$ alkyl groups, aryl groups, halogen atoms and $C_1$ to $C_4$ alkoxy groups; the d's are independently integers having a value of from 1 to 4; and $R_1$ is selected from the group of —O—, —S—, —S—S—, —SO—, —$SO_2$, alkylene, alkylidene, cycloalkylene, cycloalkylidene; the halogen or aryl substituted alkylene, alkylidene, cycloalkylene and cycloalkylidene; arylene, aromatic radicals fused to both Ar groups, and a chemical bond.

4. A block copolymer as defined in claim 2 where the dihydric phenol is hydroquinone or resorcinol.

5. A block copolymer as defined in claim 2 where the dihydric phenol is a naphthalene diol.

6. A block copolymer as defined in claims 3 or 4 where the dihydric phenol is one or more of the following

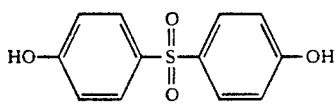

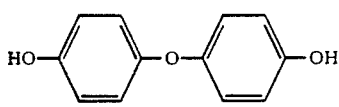

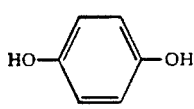

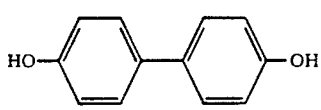

and

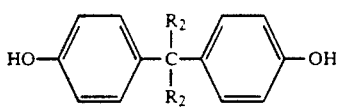

where the R$_2$ groups are independently hydrogen, lower alkyl, aryl or the halogen substituted derivatives thereof.

7. A block copolymer as defined in claim 2 where E' is the residuum of a dihalobenzenoid or a dinitrobenzenoid compound and wherein the inert electron withdrawing group is a monovalent group.

8. A block copolymer as defined in claim 7 where the monovalent electron withdrawing group is selected from nitro, halogen, phenyl sulfone, alkyl sulfone, cyano, trifluoromethyl and nitroso.

9. A block copolymer as defined in claim 2 where E' is the residuum of a dihalobenzenoid or a dinitrobenzenoid compound and wherein the inert electron withdrawing group is a divalent group.

10. A block copolymer as defined in claim 9 where the divalent electron withdrawing group is selected from

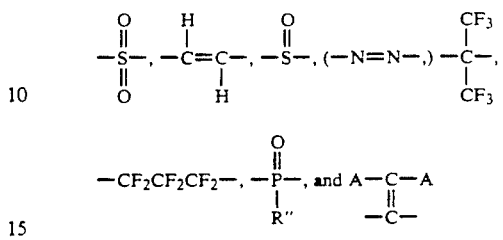

where R''' is a hydrocarbon radical and A is halogen or hydrogen.

11. A block copolymer as defined in claims 8 or 10 where the dihalobenzenoid compound is one or more of the following

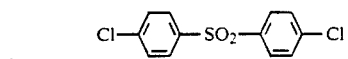

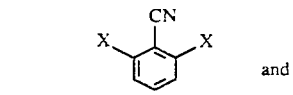

and

X = Cl; X = F

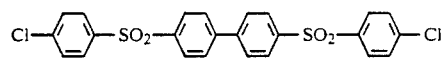

12. A block copolymer as defined in claim 2 where the poly(aryl ether) block has one or more repeating units of the formulae

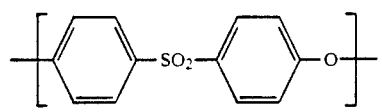

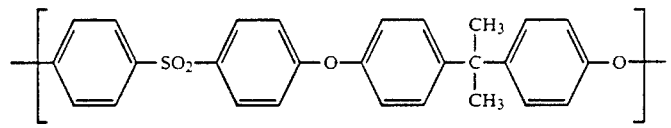

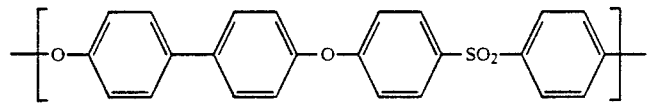

and

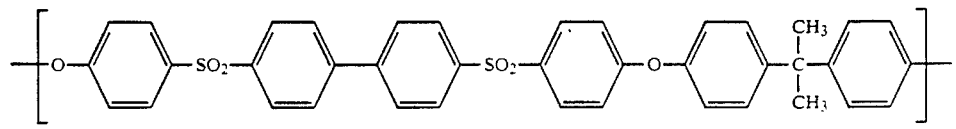

13. A block copolymer as defined in claim 1 where the poly(aryl ether ketone) blocks are one or more of the formulae